United States Patent
Keigley et al.

(10) Patent No.: US 12,024,852 B2
(45) Date of Patent: Jul. 2, 2024

(54) WORK MACHINES INCLUDING AUTOMATIC GRADING FEATURES AND FUNCTIONS

(71) Applicant: ABI ATTACHMENTS, INC., Mishawaka, IN (US)

(72) Inventors: Kevin V. Keigley, Osceola, IN (US); Nathaniel Lee Smith, Goshen, IN (US)

(73) Assignee: ABI Attachments, Inc., Mishawaka, IN (US)

( * ) Notice: Subject to any disclaimer, the term of this patent is extended or adjusted under 35 U.S.C. 154(b) by 817 days.

(21) Appl. No.: 17/170,210

(22) Filed: Feb. 8, 2021

(65) Prior Publication Data
US 2021/0172149 A1    Jun. 10, 2021

Related U.S. Application Data

(60) Continuation-in-part of application No. 16/686,639, filed on Nov. 18, 2019, now Pat. No. 10,914,051, which is a continuation of application No. 16/378,814, filed on Apr. 9, 2019, now Pat. No. 10,487,475, which is a division of application No. 15/943,070, filed on Apr. 2, 2018, now Pat. No. 10,287,745, which is a continuation-in-part of application No. 15/484,695, filed on Apr. 11, 2017, now Pat. No. 10,287,744.

(60) Provisional application No. 62/322,030, filed on Apr. 13, 2016.

(51) Int. Cl.
| | | |
|---|---|---|
| E02F 3/84 | (2006.01) | |
| A01B 63/00 | (2006.01) | |
| A01B 63/114 | (2006.01) | |
| E02F 3/76 | (2006.01) | |
| E02F 3/815 | (2006.01) | |
| A01B 63/111 | (2006.01) | |

(52) U.S. Cl.
CPC ............ *E02F 3/844* (2013.01); *A01B 63/008* (2013.01); *A01B 63/114* (2013.01); *E02F 3/7604* (2013.01); *E02F 3/8157* (2013.01); *A01B 63/1112* (2013.01); *E02F 3/847* (2013.01)

(58) Field of Classification Search
CPC . A01B 63/008; A01B 63/1112; A01B 63/114; E02F 3/7604; E02F 3/8157; E02F 3/844; E02F 3/847
See application file for complete search history.

(56) References Cited

U.S. PATENT DOCUMENTS

| | | |
|---|---|---|
| 2,358,298 A | 9/1944 | Benjamin |
| 3,048,229 A | 8/1962 | Simpson |
| 3,101,794 A | 8/1963 | Bechman |

(Continued)

*Primary Examiner* — Gary S Hartmann
(74) *Attorney, Agent, or Firm* — Taft Stettinius & Hollister LLP

(57) ABSTRACT

A work machine includes a first actuator operatively coupled with a first suspension element and a second actuator operatively coupled with a second suspension element. A grading tool assembly is operatively coupled with the first suspension element and the second suspension element. A receiver is operatively coupled with the chassis and configured and operable to detect a wireless signal. An electronic controller is in operative communication with the receiver, the first actuator, and the second actuator and is configured and operable to control the first actuator and the second actuator in response to a wireless signal detected by the receiver.

20 Claims, 31 Drawing Sheets

(56) References Cited

U.S. PATENT DOCUMENTS

| | | | |
|---|---|---|---|
| 3,494,426 | A | 2/1970 | Studebaker |
| 3,554,291 | A | 1/1971 | Rogers |
| 3,588,249 | A | 6/1971 | Studebaker |
| 3,887,012 | A | 6/1975 | Scholl et al. |
| 4,062,634 | A | 12/1977 | Rando |
| 4,356,644 | A | 11/1982 | Harkness |
| 4,807,131 | A | 2/1989 | Clegg |
| 4,820,041 | A | 4/1989 | Davidson et al. |
| 4,854,565 | A | 8/1989 | Ritsch |
| 5,065,561 | A | 11/1991 | Hadley |
| 5,327,345 | A | 7/1994 | Nielsen et al. |
| 5,375,663 | A | 12/1994 | Teach |
| 5,764,511 | A | 6/1998 | Henderson |
| 5,771,978 | A | 6/1998 | Davidson et al. |
| 5,983,511 | A | 11/1999 | Osaragi |
| 6,022,171 | A | 2/2000 | Munoz |
| 6,168,348 | B1 | 1/2001 | Meyer et al. |
| 6,966,387 | B2 | 11/2005 | Marriott, Jr. et al. |
| 7,121,762 | B2 | 10/2006 | Quenzi et al. |
| 7,195,423 | B2 | 3/2007 | Halonen et al. |
| 7,407,339 | B2 | 8/2008 | Halonen |
| 7,552,539 | B2 | 6/2009 | Piekutowski |
| 7,850,393 | B2 | 12/2010 | Hamel |
| 7,946,787 | B2 | 5/2011 | Glee |
| 7,970,519 | B2 | 6/2011 | Green |
| 8,038,366 | B2 | 10/2011 | Halonen |
| 8,448,444 | B2 | 5/2013 | Armas |
| 8,634,991 | B2 | 1/2014 | Douglas |
| 8,768,577 | B2 | 7/2014 | Lougheed |
| 9,043,097 | B2 | 5/2015 | Fehr |
| 9,234,329 | B2 | 1/2016 | Jaliwala et al. |
| 9,332,687 | B2 | 5/2016 | Keigley |
| 9,650,763 | B2 | 5/2017 | Taylor et al. |
| 9,883,621 | B2 | 2/2018 | Keigley |
| 10,174,479 | B2 | 1/2019 | Ciarla |
| 10,287,744 | B1 | 5/2019 | Keigley |
| 10,287,745 | B1 | 5/2019 | Keigley |
| 10,487,475 | B1 * | 11/2019 | Keigley .................. E02F 3/844 |
| 10,492,354 | B2 * | 12/2019 | Keigley ................ A01B 63/145 |
| 10,753,066 | B2 | 8/2020 | Ono |
| 10,914,051 | B2 * | 2/2021 | Keigley ................ E02F 3/8157 |
| 2008/0011496 | A1 | 1/2008 | Garrison et al. |
| 2008/0087447 | A1 | 4/2008 | Piekutowski |
| 2010/0023228 | A1 | 1/2010 | Montgomery |
| 2011/0083857 | A1 | 4/2011 | Leith |
| 2013/0158814 | A1 | 6/2013 | Evenson |
| 2013/0161684 | A1 | 6/2013 | Quenzi |
| 2014/0356065 | A1 | 12/2014 | Munoz |
| 2016/0097183 | A1 | 4/2016 | Kirsch |
| 2018/0116097 | A1 | 5/2018 | Keigley |
| 2018/0199501 | A1 | 7/2018 | Gadzella |
| 2018/0230674 | A1 | 8/2018 | Keigley |
| 2020/0068774 | A1 * | 3/2020 | Keigley ................ A01B 63/145 |

\* cited by examiner

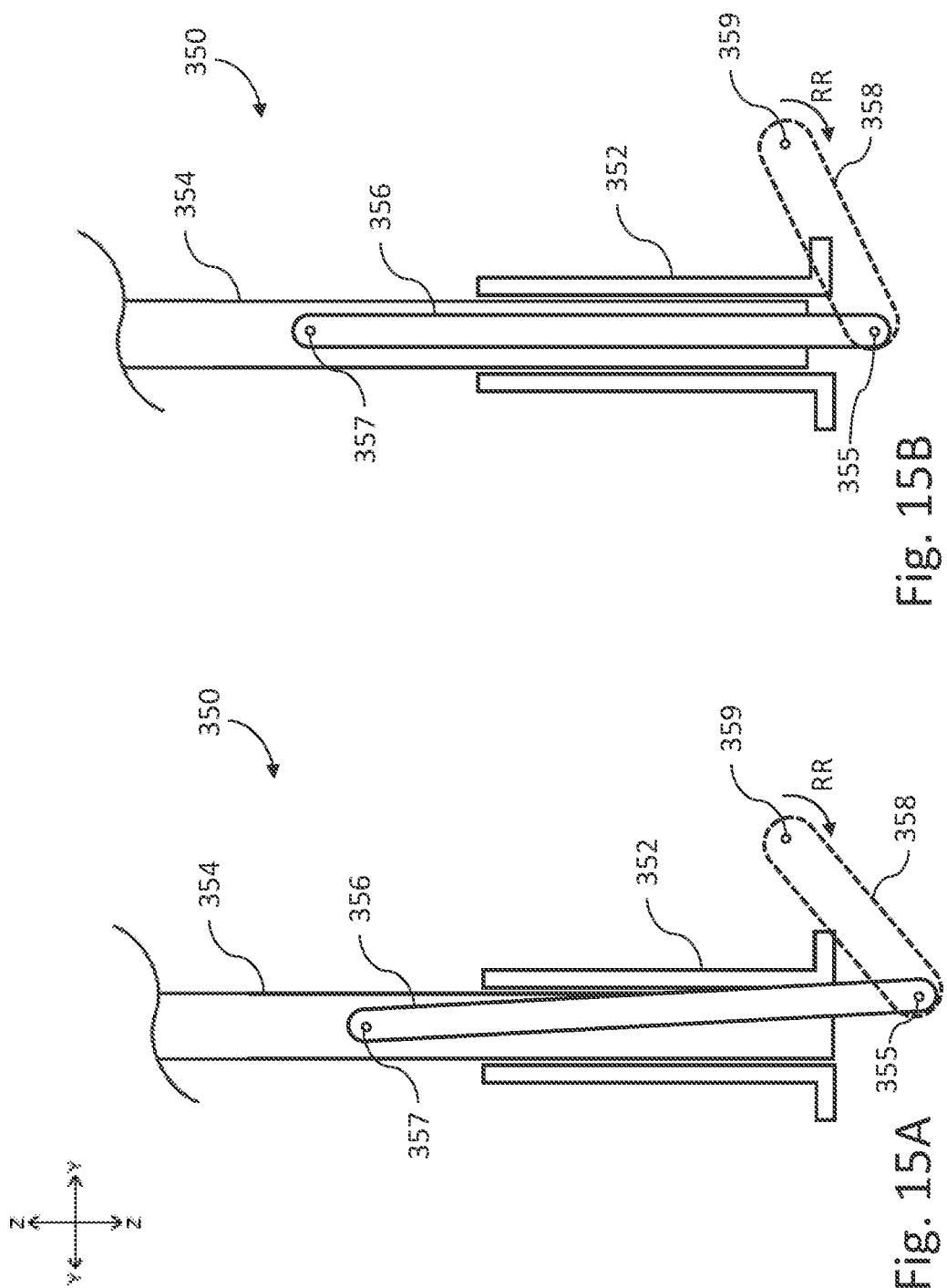

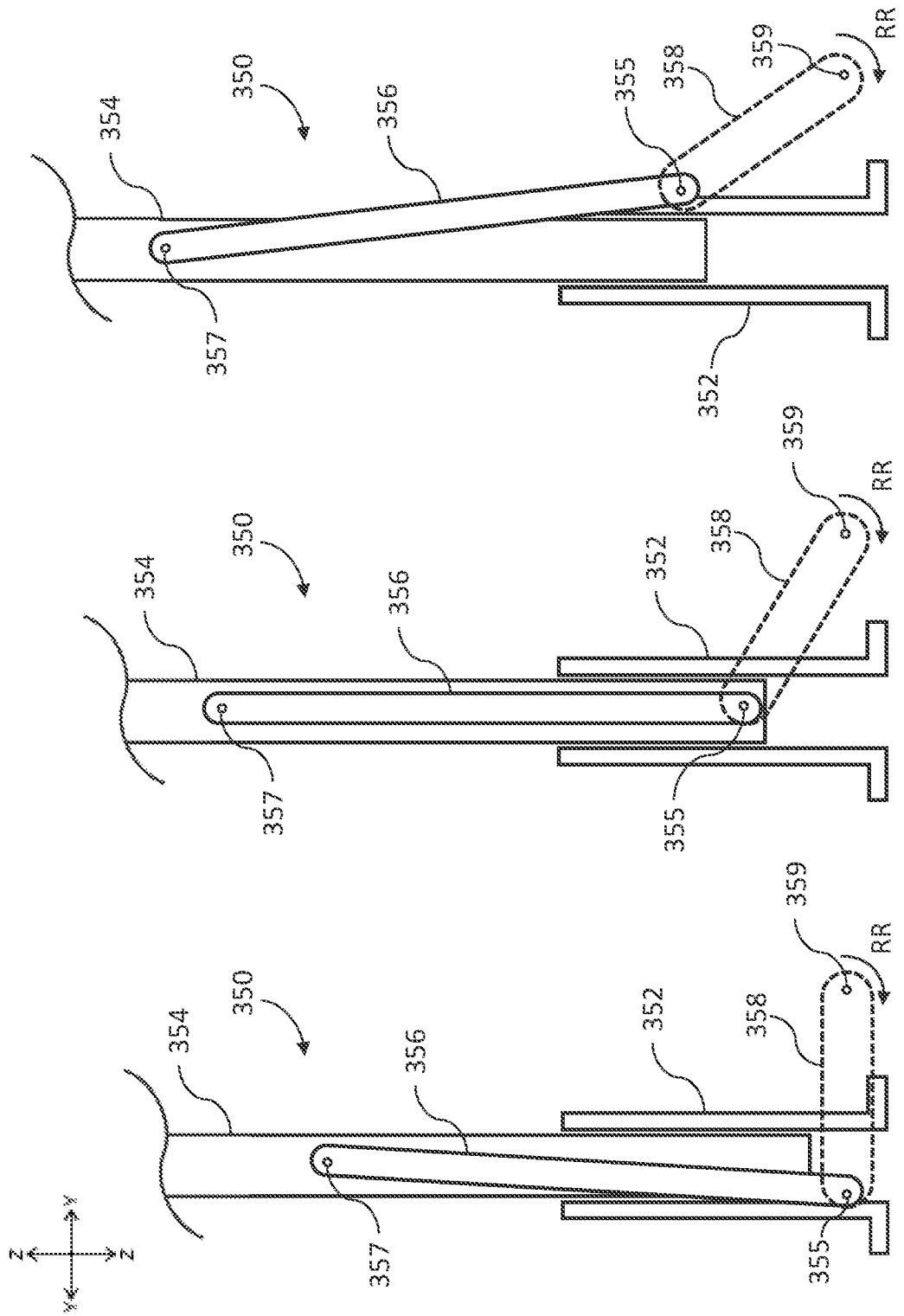

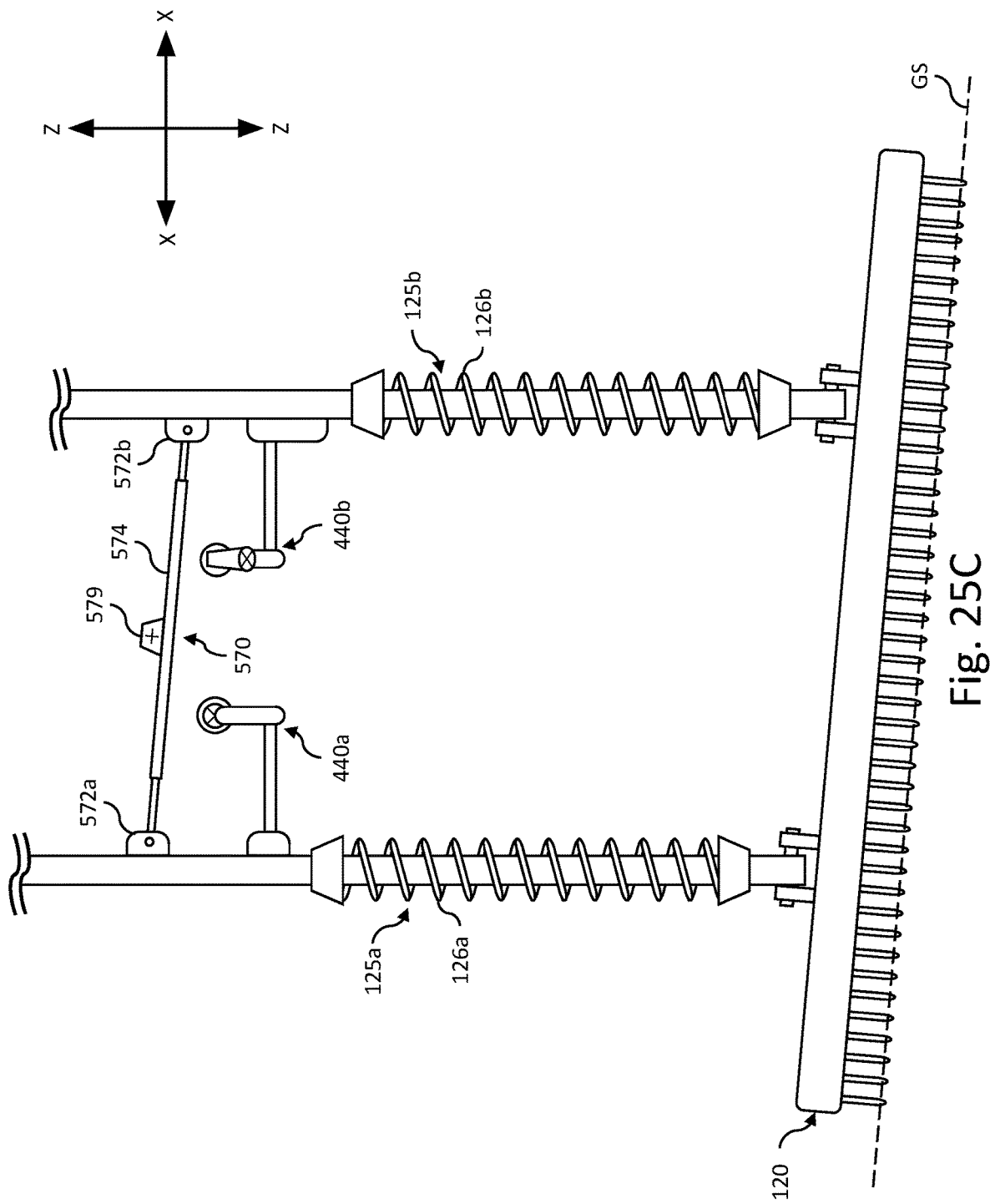

WORK MACHINES INCLUDING AUTOMATIC GRADING FEATURES AND FUNCTIONS

CROSS-REFERENCE

This is a continuation-in-part of U.S. application Ser. No. 16/686,639 filed Nov. 18, 2019, which is a continuation of U.S. application Ser. No. 16/378,814 filed Apr. 9, 2019 and now issued as U.S. Pat. No. 10,487,475, which is a divisional of U.S. application Ser. No. 15/943,070 filed Apr. 2, 2018 and now issued as U.S. Pat. No. 10,287,745, which is a continuation-in-part of U.S. application Ser. No. 15/484,695 filed Apr. 11, 2017 and now issued as U.S. Pat. No. 10,287,744, which claims the benefit of and priority to U.S. Application No. 62/322,030 filed Apr. 13, 2016, the disclosures of which are hereby incorporated by reference.

BACKGROUND

The present application relates generally to work machines including automatic or automated grading features and functions. Grading of earth or substrate is a necessary part of landscaping, grounds keeping, building and construction projects. Systems which automatically control the depth or position of a grading tool without requiring selection by an operator have been proposed. Heretofore, such systems have suffered from a number of drawbacks and disadvantages. There remains a significant need for the unique apparatuses, systems and methods disclosed herein.

DISCLOSURE OF ILLUSTRATIVE EMBODIMENTS

For the purposes of clearly, concisely, and exactly describing example embodiments of the disclosure, the manner and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

One example embodiment is a work machine including a chassis, ground contacting members rotatably coupled with the chassis and one or more actuators coupled with the chassis. A receiver is coupled with the chassis and is structured to detect a wireless signal. An electronic controller is in operative communication with the receiver and the one or more actuators. The electronic controller is structured to adjust the one or more actuators in response to a wireless signal detected by the receiver. Further embodiments, forms, objects, features, advantages, aspects, and benefits shall become apparent from the following description and drawings.

BRIEF DESCRIPTION OF THE DRAWINGS

FIGS. 15A-15E are schematic illustrations of certain aspects of the automatic grading system of FIG. 11 in different states of adjustment.

FIGS. 25A, 25B, and 25C are partially schematic front views of one form of a portion of the example work machine of FIG. 17 in several states of adjustment.

DETAILED DESCRIPTION OF ILLUSTRATIVE EMBODIMENTS

Figure 1:
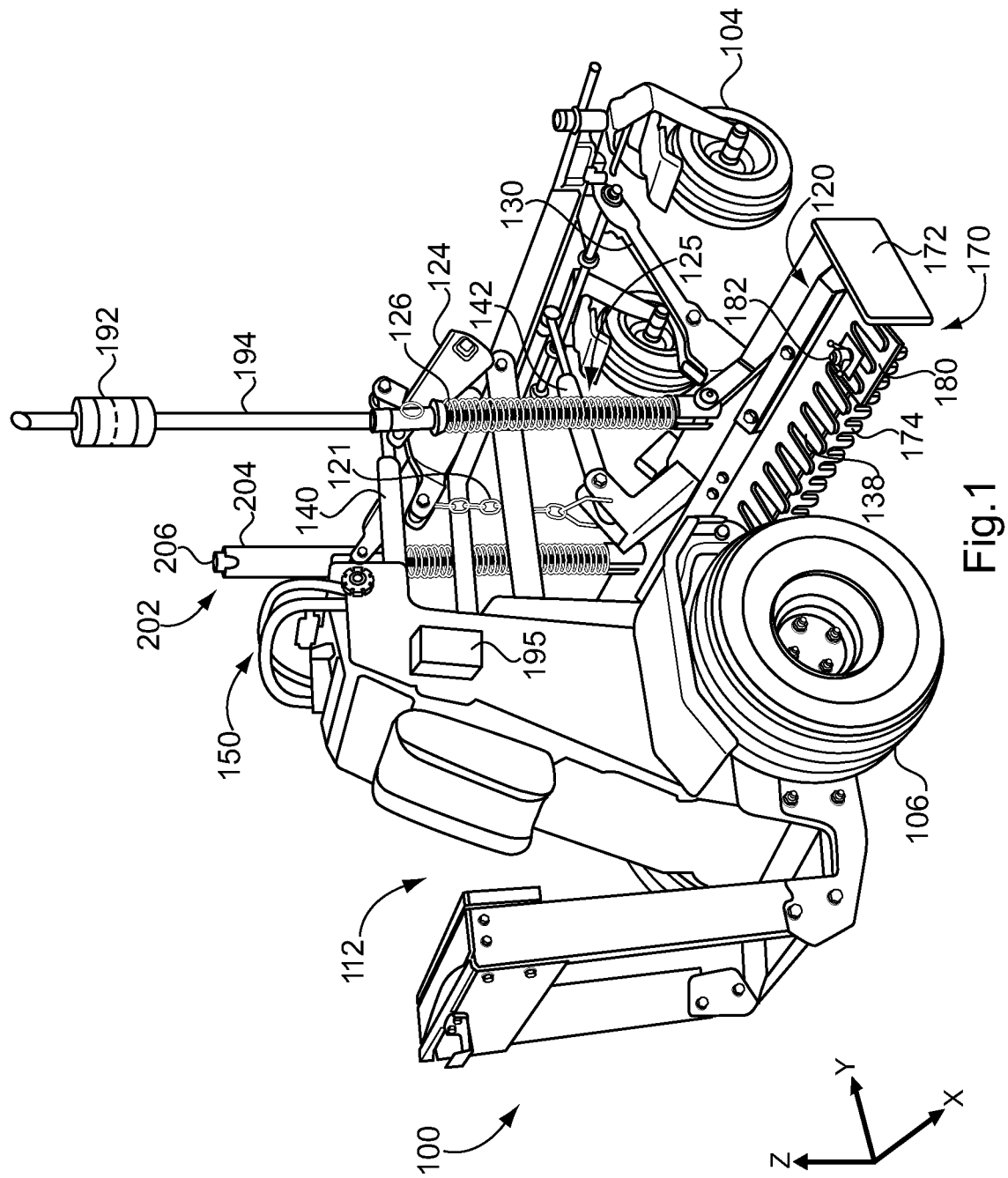
FIG. 1 is a perspective view illustrating certain aspects of an example work machine including an automatic grading system.
Figure 2:
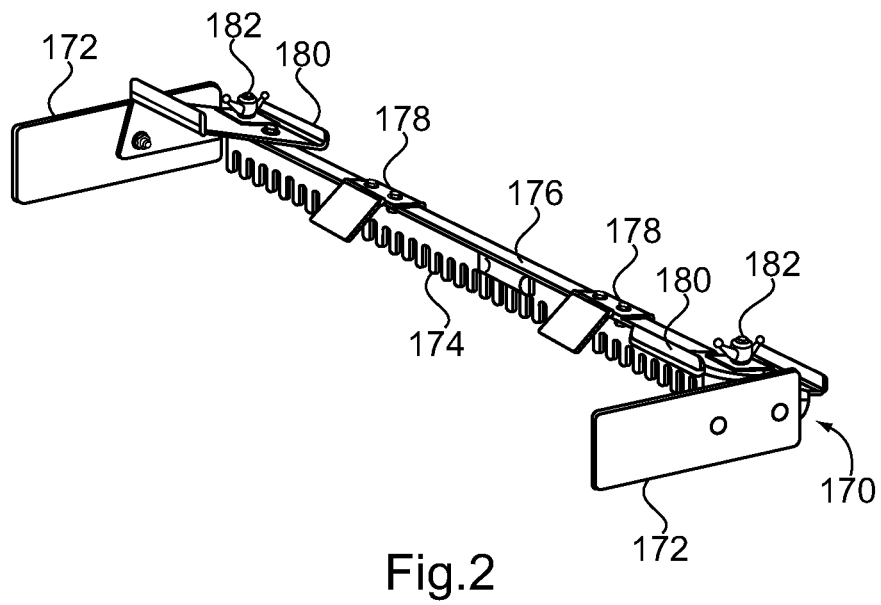
FIGS. 2-6 are perspective views illustrating certain components of the automatic grading system of FIG. 1 from alternate perspectives.
Figure 3:
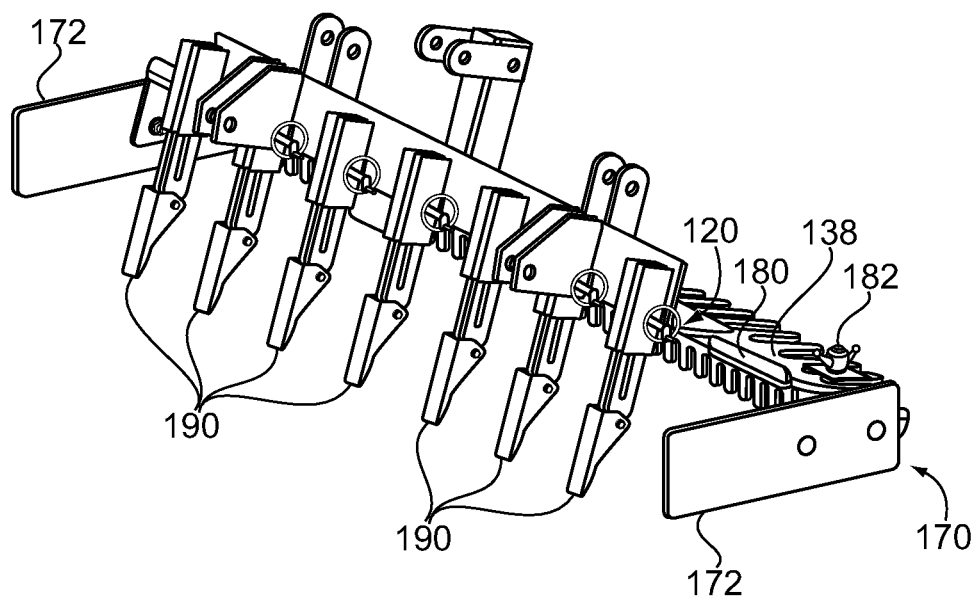
Figure 4:
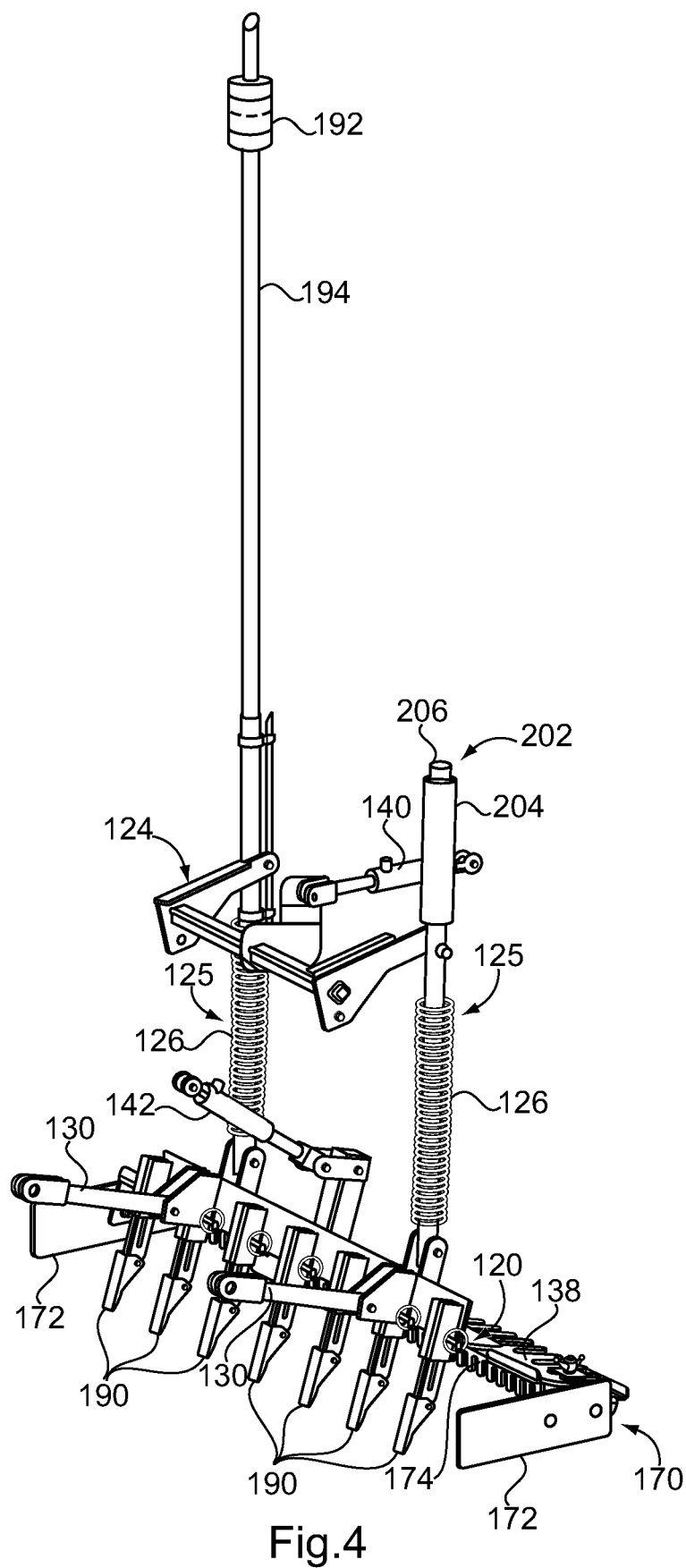
Figure 5:
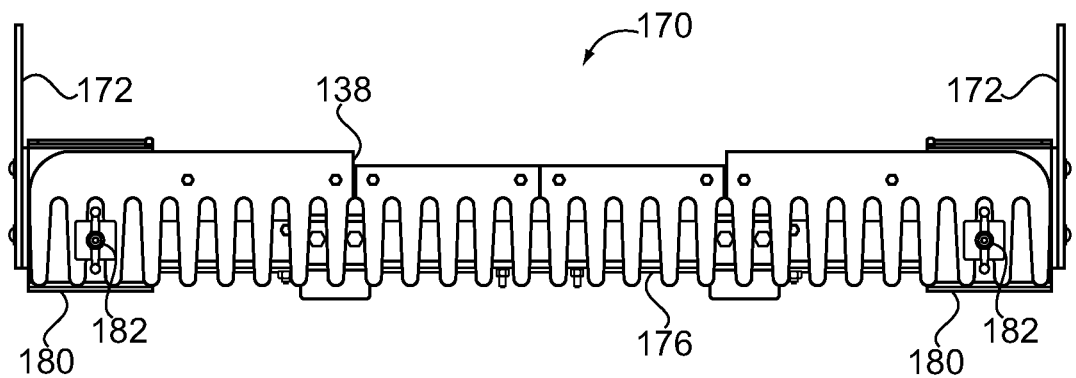
Figure 6:
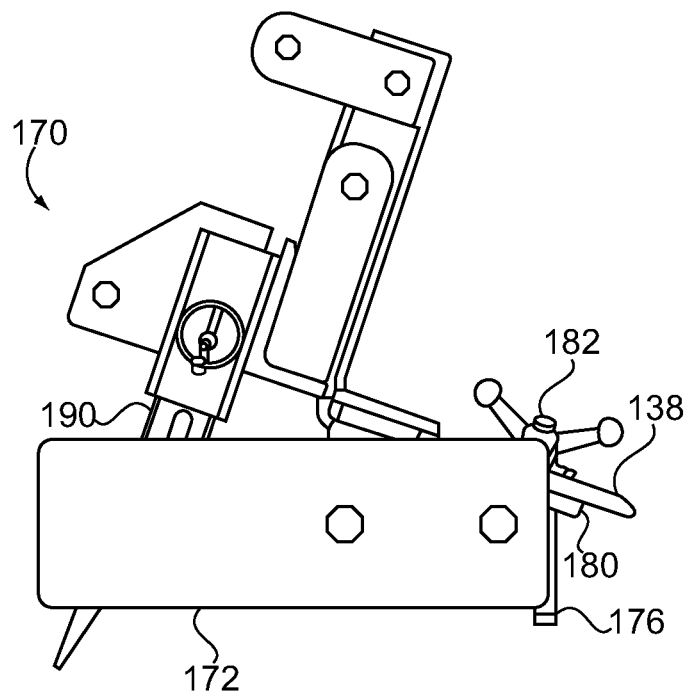

With reference to FIG. 1, there is illustrated a perspective view of an example work machine 100 operatively coupled with an automatic grading system. In the illustrated embodiments, work machine 100 is a light-duty work machine with a substantially zero turning radius. It shall be appreciated, however, that other types of work machines may also be utilized in connection with the automatic grading systems and components disclosed herein.

Machine 100 is one example of a self-propelled light-duty work machine. In a preferred embodiment work machine 100 has a weight of about 1100 pounds and a propulsion system comprising a rated power of 18 hp or less. Additional embodiments comprise self-propelled light-duty work machines including a propulsion system comprising a rated power of 25 hp or less, weighing 1500 pounds or less, or comprising both of said attributes. Further embodiments comprise self-propelled light-duty work machines including a propulsion system comprising a rated power of 30 hp or less, weighing 2000 pounds or less, or comprising both of said attributes.

Work machine 100 includes a chassis supported by front wheels 104 and rear wheels 106 which contact a ground surface and support the chassis. As will be understood by a person of skill in the art the front wheels 104 and the rear wheels 106 are examples of ground contacting members rotatably coupled with the chassis of work machine 100. In the illustrated embodiments the chassis is configured to provide an example frame structure with which various work machine elements and tool elements are coupled. It shall be appreciated that the chassis of work machines according to other embodiments may comprise a variety of structures including frame-based chassis, unibody chassis, or other types of chassis or support structures that are configured to be supported by ground contacting wheels or other ground contacting members and coupled with one or more soil working tools.

In the illustrated embodiment the front wheels 104 of work machine 100 are configured as caster type wheels which preferably are rotatable 360 degrees relative to the chassis. It shall be appreciated that a variety of differently configured front wheels 104 may be utilized including, for example, front wheels provided on an axle, rack, and pinion assembly, or other types of front end steering assembly and/or front end drive assembly. It shall be further appreciated that additional embodiments may include only a single front wheel, a greater number of front wheels, or may include ground surface contacting elements other than wheels, such as treads or tracks. While the front wheels 104 are non-driven wheels in the illustrated embodiments, it shall be appreciated that other embodiments comprise one or more driven front wheels configured to provide at least part of the propulsion to the work machine.

In the illustrated embodiments the rear wheels 106 of work machine 100 are coupled with a machine prime mover. In a preferred embodiment, the prime mover comprises an internal combustion engine configured to drive a hydraulic pump that is flow coupled with a hydraulic drive system configured to provide torque to the rear wheels 106. Example hydraulic drive systems may include elements such as high-pressure accumulators, low-pressure reservoirs, secondary pumps, gearboxes, collectors, and/or differentials. In other embodiments, the prime mover is configured as an internal combustion engine configured to provide driving torque through an output shaft. In other embodiments, the prime mover comprises an internal combustion engine and/or an electric motor configured to provide output torque. The electric motor may be powered by a battery or other power storage source, by a generator driven by an internal combustion engine, or a combination thereof.

In the illustrated embodiments each of the rear wheels 106 is independently controllable and drivable in a forward or reverse direction, though other embodiments may comprise different drive wheel arrangements, including front-wheel drive arrangements, all-wheel drive and four-wheel drive arrangements, to name several non-limiting examples. Certain embodiments may comprise only a single rear-wheel or a greater number of rear wheels 106 or other ground contacting members. Certain embodiments may include additional driven ground contacting wheels, for example, two ground contacting wheels may be provided on truck structures provided on either side of and pivotally coupled with the work machine in a tandem walking arrangement, and each of the four overall ground contacting wheels may be independently driven by a hydraulic motor or an electric motor.

The chassis supports an operator station 112 which includes a standing platform and a guard rail positioned at the aft end of work machine 100 adjacent the standing platform. Operator controls 150 are positioned to be manipulatable by an operator occupying the operator station 112 in order to control movement or propulsion of the work machine 100 as well as the positioning of one or more tools carried by the work machine as further described herein. It shall be appreciated that operator controls 150 may include one or more levers or other operator manipulatable controls that are operatively coupled with valves and hydraulic fluid lines to control one or more hydraulic actuators of the work machine. For clarity of illustration these features have not been depicted in the illustrated embodiments. Furthermore, in certain embodiments, the operator station 112 may comprise an operator seat instead of or in addition to a standing platform. In certain embodiments the operator station 112 may be omitted and the machine may be controlled remotely using a separate operator control station in wireless communication with a controller provided on the machine 100 and configured to control movement or propulsion of the machine 100 as well as the positioning of one or more tools carried by the work machine.

With reference to FIGS. 1-6, there are illustrated several views of various components of the example automatic grading system which is operatively coupled with work machine 100 in the view of FIG. 1 and separately from various components of work machine 100 in the views of FIGS. 2-6. The automatic grading system includes a tool mount 120 which is operatively coupled with a grading tool assembly including finishing box 170 and scarifying shanks 190. In the illustrated embodiments, scarifying shanks 190 are attached to tool mount 120 and finishing box 170 is attached to finishing comb 138 which is in turn attached to tool mount 120 as is further described below. In this form, finishing comb 138 may be considered as both a tool component and a tool mount component. Other embodiments contemplate different configurations for tool mount 120 and the tool components coupled therewith, for example, finishing box 170 may be coupled directly with tool mount 120 or intermediately coupled to tool mount 120 by various other intermediate structures. Similarly, scarifying shanks 190 may be coupled with tool mount 120 in other locations or directly coupled with other components which are, in turn, coupled with tool mount 120. Furthermore, tool mount 120 may be provided with different dimensions and shapes as the illustrated form.

Finishing box 170 includes rear wall member 174 extending a distance along the width of the work machine 100 in the X-axis direction and side wall members 172 extending a distance along the length of the work machine 100 to a location forward from the rear wall in the Y-axis direction. Rear wall member 174 includes a lower toothed edge in the illustrated embodiments but may also be provided with a straight edge. Member 176 extends a distance along the width of the work machine 100 in the X-axis direction and is coupled with rear wall member 174. Members 178 are attached to member 174 and are positioned at a distance from one another and structured with angled portions to provide a surface over which the wheels or other ground contacting members of work machine 100 can travel to facilitate work machine 100 driving over finishing box 170 during connection or disconnection of the grading tool assembly. Members 180 are attached to member 176 and side wall members 172. The bottom surface of members 180 is configured to rest against finishing comb 138. Attachment members 182 include a portion structured and positioned to pass through a gap intermediate teeth of finishing comb 138 and an attachment mechanism 182 structured to selectably clamp members 180 to finishing comb 138. In the illustrated embodiments, attachment mechanism 182 is structured to include nut with handles to facilitate attachment of the finishing box 170 to the comb 138 without specialized tools, or with minimal use of tools such as a pipe extension for applying additional torque to the attachment mechanism.

Scarifying shanks 190 are coupled with tool mount 120 and positioned forward from the rear wall member in the Y-axis direction and between the side wall members in the X-axis direction. Scarifying shanks 190 are one example of ground penetrating members which may be provided in a grading tool assembly. During operation of the grading tool assembly, scarifying shanks penetrate the ground surface ahead of rear wall member 174 and disrupt and loosen the earth through which they path. Rear wall member 174 and side wall members 172 form a container structured that collects and moves the loosened earth.

By varying the height of the grading tool assembly in the Z-axis direction, finishing box 170 and scarifying shanks 190 can be utilized to grade the underlying ground surface to a selectably height. By varying the pitch of the grading tool assembly relative to the X-Y plane, the amount of earth collected and released by finishing box 170 can be varied. By adjusting the pitch so that end wall member 174 rotates toward the earth being graded, finishing box 170 can be adjusted to increase earth collection and transport. By adjusting the pitch so that end wall member 174 rotates away from the earth being graded, finishing box 170 can be adjusted to decrease earth collection and transport. It shall be appreciated that pitch adjustment can occur while maintaining a given height adjustment or concurrently with a height adjustment as further described herein.

During pitch adjustment of the grading tool assembly the depth of penetration into the earth of scarifying shanks 190 will also vary. By adjusting the pitch so that end wall member 174 rotates toward the earth being graded, scarifying shanks 190 rotate so that they penetrate the earth to a lesser depth (or are extracted entirely). The coordinated rotation of finishing box 170 and scarifying shanks 190 in this direction reduces earth loosening and increases earth transport. This permits increases in earth transport while also reducing propulsion opposing force attributable to the scarifying shanks 190. By adjusting the pitch so that end wall member 174 rotates away from the earth being graded, scarifying shanks 190 rotate so that they penetrate the earth to a greater depth. The coordinated rotation of finishing box 170 and scarifying shanks 190 in this direction increases earth loosening and decreases earth transport. This permits increases in earth disruption while also reducing propulsion opposing force attributable to the finishing box 170.

Tool mount 120 and the grading tool assembly coupled therewith including finishing box 170 and scarifying shanks 190 are moveable relative to the chassis of work machine 100 in several manners including translational movement generally in the direction of the Y-axis, translational movement generally in the direction of the Z-axis, and rotational movement about an axis generally parallel with the X-axis direction. Tool mount 120 is coupled with an actuator 142 at a pivotable coupling. Actuator 142 is also coupled with the chassis of work machine 100 at a pivotable coupling. In the illustrated embodiments actuator 142 is configured as a hydraulic cylinder which is laterally expandable and contractible generally in the Y-axis direction. The operator controls 150 may be configured to control the supply of pressurized hydraulic fluid to actuator 142 to control its position.

Tool mount 120 is connected to rocker 124 by a chain 121 or another flexible rigging member. Rocker 124 is coupled with actuator 140 at a pivotable coupling. Actuator 140 is also coupled with the chassis of the work machine 100 at a further pivotable coupling. In the illustrated embodiments actuator 140 is configured as a hydraulic cylinder which may be controlled in the same or similar fashion as actuator 142. It shall be appreciated that either or both of actuators 140 and 142 may be provided in different configurations, for example, as ratchets, top links or other actuators configured to provide appropriate displacement and force. It shall further be appreciated that either or both of actuators 140 and 142 may be omitted in certain embodiments. In such embodiments vertical adjustment of a tool mount is preferably, though not necessarily, provided by actuators configured to adjust other structural elements of a machine, for example, adjustable wheel suspension elements configured to raise or lower a chassis or other structure supporting, directly or indirectly a tool mount, or via a variety of other actuators.

In the illustrated embodiments actuator 140 is selectably controllable to expand and contract in the Y-axis direction effective to cause rocker 124 to rotate relative to the chassis about an axis parallel with the X-axis direction. Rotation of the rocker 124 is effective to raise and lower the tool mount 120 with the chain 121 over a first predetermined range from a maximum height to the point at which the support wheels 104, 106 contacts the ground surface underlying the machine 100. Support wheels 104, 106 are structured to ride along the underlying ground surface and limit further downward motion of the tool mount 120 and structured coupled thereto while concurrently allowing further rotation of the rocker 124 to compress or decompress the springs 126 or other elements of suspension 125. Thus, rotation of the rocker 124 is effective to vary the amount of spring action force applied to the tool mount 120 by varying the compression of springs 126 without substantially changing the Z-axis position of the tool mount 120. The suspension 125 accommodates movement of the tool mount in response to external force applied thereto, for example, if the tool mount contacts an obstruction such as a rock or other structure located in a soil medium being worked.

It shall be appreciated that chain 121 is one example of a weight lifting structure that may be utilized to raise and lower a soil working tool or tool mount. Structures such as cables, jointed linkages and other structures that limit relative displacement of a tool relative to a support structure to allow lifting through actuation in one direction, and deform, bend, flex, move or otherwise accommodate movement. It shall be further appreciated that chain 121 (or other lifting member(s)) may be to provide different and variable preloading of the springs or compressible members of suspension 125.

Actuator 142 is selectably controllable to expand and contract generally in the Y-axis direction effective to cause tool mount 120 to rotate relative to the work machine about an axis generally parallel with the X-axis direction as indicated by arrow RM. In this manner the pitch of the tool mount X-Y plane may be varied. This rotation can be utilized to rotate the grading tool assembly (raising one end and lowering the other) relative to the underlying ground surface and to control the force it applies to the underlying ground surface in the Z-axis direction.

Tool mount 120 is further coupled with a suspension 125 by a pivotable coupling. The suspension 125 is in turn connected to rocker 124 at a pivotable coupling. Rocker 124 is further coupled with the chassis at a pivotable coupling. In the illustrated embodiments the suspension 125 is configured as a pair of telescoping cylinders in combination with springs 126 which are compressible between spring mounts through relative motion of the telescoping cylinders. It shall be appreciated that a variety of other suspensions may be utilized in various embodiments in addition to or instead of the illustrated configuration including shock absorbers, elastomeric suspension elements, compressible members, pneumatic suspension elements, hydraulic suspension elements, other spring arrangements and combinations of the foregoing and/or other suspension elements. It shall be further appreciated that a variety of springs and spring mounts may be utilized. In the illustrated embodiments springs 126 are helical and the spring mounts are crimped or compressed in place relative to respective shafts or cylinders of a telescoping assembly. In certain embodiments the spring mounts may alternatively or additionally be welded, bonded, bolted or otherwise fixedly coupled with respective suspension elements. Certain embodiments comprise spring mounts adjustably coupled with respective suspension elements, for example, through an axial threaded connection which may utilize one or more lock nuts or other locking members, or by a set screw, pin or bolt.

The tool mount 120 is further coupled with a pulling linkage 130 at a pivotable coupling which rotates generally about an axis in parallel with the X-axis direction. Pulling linkage 130 is coupled with the chassis of the work machine at a pivotable coupling which rotates about an axis in parallel with the X-axis direction. Pulling linkage is configured to provide a force vector component to the tool assembly in the forward or reverse Y-axis direction as the machine is propelled forward or backward. A force vector component generally in the Y-axis direction may also be provided, for example, during turning of the machine. Regardless of the particular direction, the pulling linkage provides one or more force vector components providing working force to the tool assembly. Furthermore, the rotation permitted by pivotable couplings between pulling linkage and the chassis of the work machine accommodates both adjustment of the height and pitch of the tool assembly relative to the X-Y plane.

The above-described motion of tool mount 120 and the grading tool assembly can be controlled in an automated manner by an electronic control system. In the illustrated embodiments, the electronic control system includes a receiver 192 coupled with suspension element 125 by a positioning pole 194 and an electronic controller 195 in operative communication with receiver 192, actuator 140, and optionally with actuator 142. Receiver 192 is moveable relative to and can be fixed in place in a plurality of positions along pole 194 in the Z-axis direction. This adjustability allows the receiver to be positioned relative to a reference signal source such as a rotating laser. Accordingly, in some forms receiver 192 may be structured as a laser receiver adapted to receive a laser beam output by a laser level apparatus, for example, a rotary laser, a single plane laser, a dual plane laser, a conical laser or a GPS laser. In other forms receiver 192 may be provide as or in combination with other types of wireless signal sources and signal detectors or receivers.

Electronic controller 195 may be structured as a microprocessor-based or microcontroller-based electronic control unit and may include wired input circuitry for receiving input from receiver 192 and/or wireless communication circuitry for receiving input from receiver 192. Electronic controller 195 may be configured to evaluate a reference signal, such as a laser beam received by receiver 192, and to determine actuator position adjustment commands based upon the received reference signal(s) and one or more operator-specified grading commands input to the electronic controller 195. The operator-specified grading commands input to the electronic controller may include a Z-axis grade elevation and a grade angle and direction which may be defined relative to the X-Y plane or another reference plane. Electronic controller may further include output circuitry adapted to provide commands to one or more actuators for adjustment of a working tool in accordance with the determined actuator position adjustment commands, for example, commands to operate a hydraulic actuator or a proportion valve of a hydraulic actuator or an electric actuator.

Electronic controller 195 may be structured to output control commands to adjust actuator 140 which is effective to simultaneously adjust the position of the receiver in the Z-axis direction and one or both of the position of the grading tool assembly in the Z-axis direction and the force applied to suspension 125 in the Z-axis direction. The degree to which the Z-axis position of the grading tool and/or the Z-axis force applied to suspension 125 are varied depends upon whether and the degree to which the grading tool assembly encounters resistance force in response to the automated control of actuator 140 by electronic controller 195. The force applied to suspension 125 in the Z-axis direction is effective to apply force to the grading tool assembly in the Z-axis direction thereby providing working force on the underlying ground surface toward the operator-specified grading commands. Additionally, it shall be appreciated that receiver 192 and pole 194 are fixedly coupled to a structure of suspension 125, such as suspension member 128, which continues to move in response to adjustment of actuator 140 as springs 126 is compressed and that motion of the grading tool assembly and suspension elements fixedly coupled thereto, such as suspension member 127, can de-couple from and vary relative to the motion of receiver 192 and pole 194 due to compression of springs 126.

In a system rigidly or fixedly interconnecting a grading tool and a receiver, the aforementioned motion and force application would result in motion of the grading tool assembly of a magnitude and direction equivalent to the motion of receiver 192. In contrast, in the illustrated embodiment the suspension 125 is compressible to vary the distance between the receiver 192 and the grading tool assembly depending upon the working force encountered by the grading tool assembly. Surprisingly, allowing the depth or position of the grading tool to vary from the position that would normally be selected using the electronic grading system has been determined to provide unique benefits and operability for light duty work machines notwithstanding the fact that it would appear contrary to the goal of automated grading depth positioning. By selecting the compression characteristics of suspension 125 relative to the weight and power of the work machine, the compression may be effective to avoid exceeding the propulsion system power output and stopping the work machine. This additional degree of freedom provides a synergistic functionality allowing automatic adjustment of the position of the grading tool assembly while also permitting variation from the automatic depth to avoid undesired stoppage of the work machine.

An additional degree of freedom is provided by actuator 142 which may be controlled to vary grading tool assembly pitch concurrently with the automatic height adjustment of the actuator 140. This allows the operator to manipulate operator controls 150 to vary the pitch of the grading tool assembly effective to vary the relative earth disrupting and earth moving functions of the grading tool assembly while simultaneously providing automatic adjustment of the overall grading depth as described above. It shall be appreciated that operator pitch adjustment may be performed concurrently with automatic height/depth adjustment by the electronic control system thus providing the operator with the ability to adjust the earth disruption and transport characteristics of the finishing box 170 while concurrently automatically controlling toward a uniform grading height. Such automated adjustment may be in response to an operator-input grade angle or elevation provided to electronic controller 195.

With reference to FIGS. 7-10 there are illustrated further details of sighting gauge system 202 and its interconnection with suspension 125. Sighting gauge system 202 includes an outer member 204 and an inner member 206 which is moveable relative to inner member 206 in the direction generally illustrated by arrow 229. Outer member 204 is structured to be adjustably coupled with suspension member 128 at one end and to slidably receive inner member 206. Outer member 204 is adjustably coupled with suspension member 128 by a set screw 231 which passes through an opening 233 defined in outer member 204 and engages a threaded opening provided in suspension member 128. Set screw 231 may be tightened to retain outer member 204 in a fixed position relative to suspension member 128 and loosened to permit adjustment of outer member 204 relative to suspension member 128 in the direction generally indicated by arrow 229. It shall be appreciated that sighting gauge system 202 is one example of a grading position indication system which is structured to provide a visually perceptible qualitative and quantitative indication of a difference between an automatic or automated commanded grading position for a grading tool and an actual position for the grading tool. In certain applications, sighting gauge system 202 is visible not only by a tool operator but also by bystanders up to 100 feet or greater distant from the vehicle.

The range of adjustability of outer member 204 relative to suspension member 128 may be defined by the upper and lower surfaces of opening 233 which come into contact with set screw 231 at respective maximum and minimum vertical adjustment positions. In some forms a gap may remain between outer member 204 and suspension member 128 in the downward most position. In some forms the stepped inner surface of outer member 204 may come into contact with suspension member 128 in the downward most position. It shall be appreciated that the extent and position of opening 233 and the portion of outer member 204 in which it is provided may vary from the illustrated embodiment, for example, the opening 233 may extend downward in a greater distance to allow increased range of adjustment. The adjustable mating and coupling between outer member 204 and suspension member 128 may also comprise additional or alternate coupling and fixation structures such as additional or alternate threaded connections, detent connections, and removable pin connections to name several examples. For example, in the embodiment illustrated in FIG. 10, set screw 331 is threaded into collar 338 which extends from outer member 304. In this embodiment set screw 331 may be tightened to provide contact force against the outer surface of suspension member 328 to fix outer member 304 in place relative to suspension member 328 and loosened to permit outer member 304 to move relative to suspension member 328. It shall be appreciated that outer set screw 331, outer member 304 and suspension member 328 correspond generally to set screw 231, outer member 204 and suspension member 128 in regards to their functionality and relationship to other structures of the overall apparatus and system. It shall be further appreciated that the embodiment illustrated in FIG. 10 may be provided in connection with the other features of work machine illustrated in FIGS. 1-9 as an alternate form of sighting gauge system 202.

Figure 7:
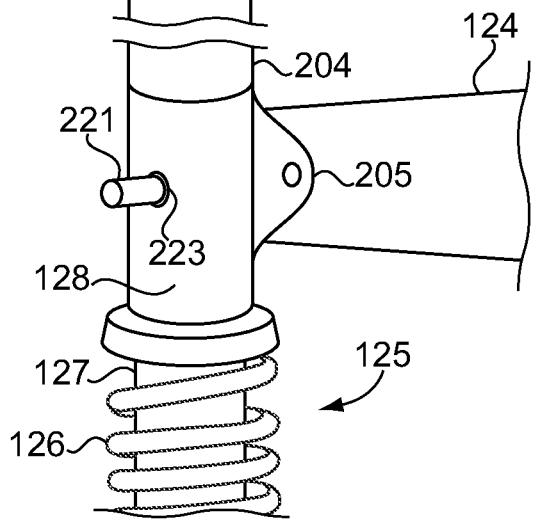
FIG. 7 is a perspective view of a grading position indication system in a first operational state.
Figure 8:
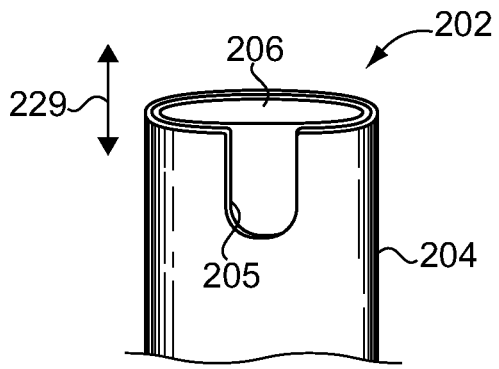
FIG. 8 is a perspective view of the grading position indication system of FIG. 7 in a second operational state.
Figure 9:
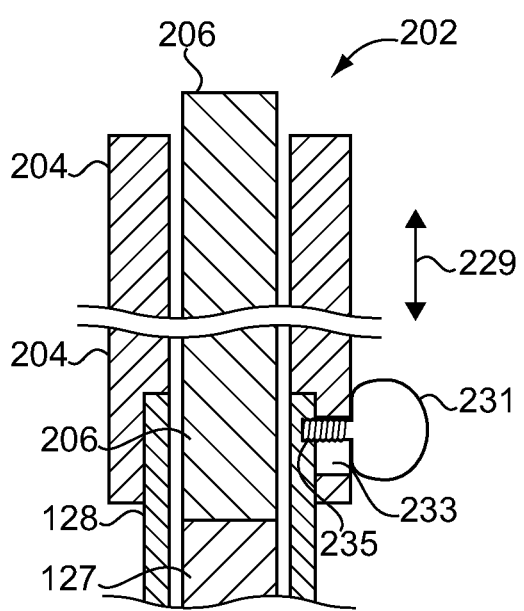
FIG. 9 is a side sectional view of a portion of the grading position indication system of FIG. 7.
Figure 10:
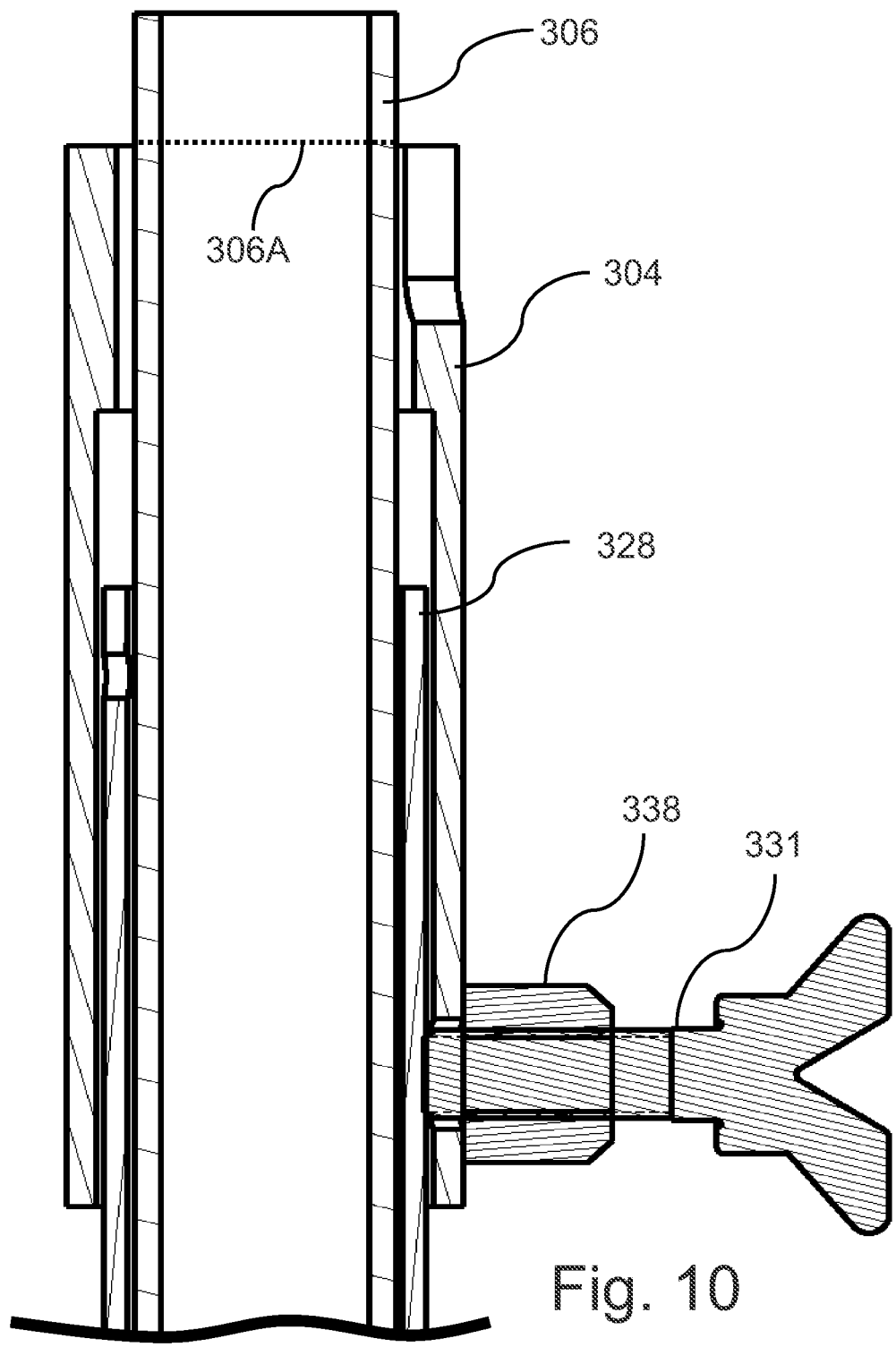
FIG. 10 is a side sectional view of a portion of a grading position indication system of FIG. 7.
Figure 11:
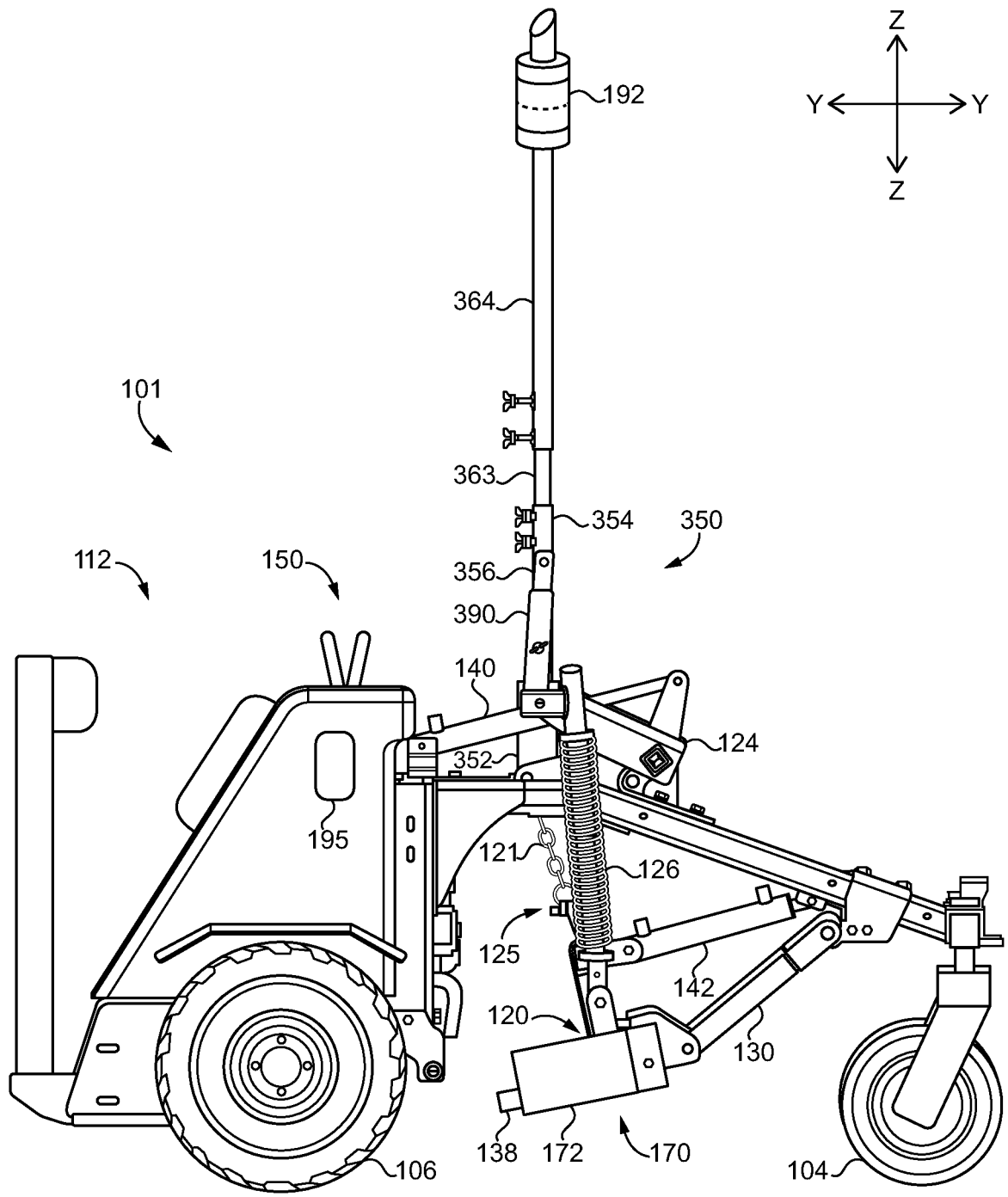
FIG. 11 is a side view illustrating certain aspects of an example work machine including an automatic grading system.

Inner member 206 is structured to abut suspension member 127 at one end and to slide relative to outer member 204. Inner member 206 may be maintained in abutment with suspension element by its own weight and/or by a mechanical coupling structure. In some forms inner member 206 may be fixed to or integrally formed with suspension member 127 to provide a unitary structure. Inner member 206 is structured to move with suspension member 127 effective to vary the relative position between inner member 206 and outer member 204. This variation in relative position provides a visually perceptible indication of a measurement of the extent to which a desired or commanded grading result needs or remains to be accomplished. In the illustrated embodiment, inner member is configured to move between a lower position which is illustrated in FIG. 8 and is also denoted by dashed line 206A in FIG. 7, and an extended upper position which is illustrated in FIGS. 7 and 9. With respect to the embodiment illustrated in FIG. 10, inner member 306 corresponds to inner member 206 and is moveable between the position illustrated in FIG. 10 and the position generally indicated by dashed line 306A which corresponds to dashed line 206A.

As discussed above in connection with FIGS. 1-6, springs 126 of suspension 125 may be compressed during operation of work machine 100 when electronic controller 195 automatically adjusts actuator 140 downward. During such adjustment, the relative positions of suspension member 128 and suspension member 127 may vary. Since suspension member 128 is fixedly (through rotatably) coupled with actuator 140 by rocker 124, its position varies in a generally fixed relationship to the motion of actuator 140. On the other hand, suspension member 127 is non-fixedly coupled with actuator 140 and may travel upward relative to suspension member 128 in response to compression of springs 126. The relative position between suspension member 127 and suspension element 128 is correlated to and may be substantially equal to a measurement of the extent to which the grading position that is commanded by controller 195 has actually been accomplished. The indication of a measurement of the extent to which a desired or commanded grading result needs or remains to be accomplished is thereby visible through the relative position of outer member 204 and inner member 206 or outer member 304 and inner member 306.

As illustrated in FIG. 7, a suspension lockout feature is provided and may be selected by inserting retaining pin 221 into an opening 223 formed in suspension member 128 and an opening formed in suspension element 127 disposed within suspension member 128. The opening formed in suspension element 127 may be selected and sized such that the alignment with opening 223 formed in suspension member 128 occurs when the suspension 125 is substantially uncompressed. At the same time, the position of outer member 204 may be adjusted to be substantially even with the upper extremity of inner member 206. In this configuration the upper end surface of inner member 206 will extend upward from the upper end surface of outer member 204 when the suspension 125 is compressed and will lie substantially even with the upper end surface of the outer member 204 when the suspension is relaxed or fully extended. This configuration provides a visual indication of the extent of compression of the suspension 125 which is visually perceptible by the operator of work machine 100 as well as operators of other work machines in the vicinity thereof. In some forms, the lockout feature may be structured such that retaining pin 221 passes entirely through outer member 204 and inner member 206. Preferably the lockout feature is employed when the desired grade is nearly completed, for example, within about ¼ inch, to avoid the possibility that premature lockout may cause the tool to lose traction. In some forms retaining pin 221 may be configured to outer member 204 and inner member 206 at an angle relative to the vertical surfaces of outer member 204 and inner member 206. An external holder may be provided to store retaining pin 221 when the lockout mode is not engaged. Clips or retention rings may also be engaged with retaining pin 221 to maintain retaining pin 221 in the installed position and prevent inadvertent removal. It shall be appreciated that retaining pin is one example of a suspension lockout member adapted to maintain suspension 125 in a fixed position. Additional examples of suspension lockout members include screws, detent mechanisms, clips, collars bolts and other structures adapted to engage suspension member 128 and suspension member 127 and maintain them fixed relative to one another.

Sighting gauge system 202 may be calibrated or adjusted by an operator in conjunction with the set-up of work machine 100 and the provision of operator-specified grading commands input to the electronic controller 195. The calibration may be performed such that the suspension 125 assumes its relaxed or extended position when the position corresponding to the operator-specified grading commands has been achieved. In such a calibration state, the position of inner member 206 or 306 relative to outer member 204 or 304, respectively, provides an indication of the distance between the current grading state of the underlying ground surface and the desired grading state of the underlying ground surface as defined by the operator-specified grading commands. It shall be further appreciated that this indication is both qualitative and quantitative in that the distance that inner member 206 or 306 extends above outer member 204 or 304 corresponds to and may be calibrated to be substantially identical to the depth of grading that must still be performed to provide the desired grading state of the underlying ground surface as defined by the operator-specified grading commands. Thus the relative position of inner member 206 or 306 relative to outer member 204 or 304 provides a visually perceptible indication of the progress toward an operator-specified grading state of the underlying grounds surface and this indicia is perceptible to the operator of the work machine as well as in a line of sight path in all directions, for example, by a bystander within 100 feet or more.

Outer member 204 includes a sighting gauge notch 205 which permits the relative position of inner member 206 and outer member 204 to be visually perceived by an operator or worksite observer even when inner member 206 is positioned below outer member 204. While outer member 204 is illustrated as having one U-shaped sighting gauge notch, it shall be appreciated that additional sighting gauge notches may be provided at other locations about outer member 204 to provide visibility from additional viewing positions.

Furthermore, the size and shape of the sighting gauge notch may vary from the illustrated embodiments and may be, for example, a V-shaped notch, a rectangular notch, or a series of holes or apertures provided along a length of outer member 204. It shall be further appreciated that shading or color contrast between inner member 206 and outer member 204 may be provided to enhance the visual perceptibility of their relative positioning and changes thereof.

It shall be appreciated that the visually perceptible indicia discussed above provides unique synergistic benefits in combination with the aforementioned automated or automatic height or depth adjustment capabilities. Such features allow the operator of a first work machine, such as work machine 100, to judge the extent to which a desired depth or height position commanded by the automatic or automated depth or height adjustment is being reached and a corresponding extent to which the suspension assembly is being compressed thereby providing an ability to determine and judge progress toward an operator defined grading state of the underlying ground surface. The visually perceptible indicia are further available to and perceivable by operators of additional work machines in the vicinity. Operators of these additional work machines my thereby take advantage of the automated grading depth control features of the first work machine without requiring those features and the apparatuses and systems provided on them to be provided on the additional work machines. Furthermore, coordinated operation of the first work machines and additional work machines of different types is enabled by this combination of features and can improve the speed and efficiency with which a grading operation may be completed.

In one example process, an athletic field or arena, such as a baseball diamond or equine arena, may be constructed or refurbished by grading with a first work machine such as work machine 100 configured to provide automated operator specified grade characteristics and by one or more additional heavier duty work machines such as a front loader, bucket vehicle or other earth moving equipment. The operators of the additional heavier duty work machines may observe the visually perceptible indicia and may qualitatively and quantitatively judge and determine progress toward the operator defined final grading state. The operators of the additional heavier duty work machines may therefore determine and judge areas of the underlying ground surface where additional grading is needed and may selectively and strategically utilize the greater earth moving capabilities afforded by heavier duty machines to target those areas where ground surface moving or removal is needed to achieve the desired grading result. Once a certain amount of progress is made, e.g., the target grade has been established to about ¼ inch, the lockout feature of the first grading tool may be engaged and the first grading tool may be utilized to complete a final finish grading operation to achieve the desired grading result.

With reference to FIGS. 11-14, 15A-15E and 16A-16E, there are illustrated several views of certain aspects of an example work machine 101 operatively coupled with an example automatic grading system. Work machine 101 and its example automatic grading system include a number of features that are the same as or similar to the features described above in connection with work machine 100 and its example automatic grading system, and a number of such features are indicated with like reference numerals in both work machine 100 and work machine 101. While certain such common features are illustrated in the drawings and described below, it shall be appreciated that all aspects, alternatives and variations described or illustrated in connection with work machine 100 also apply to and may be embodied in work machine 101 unless described to the contrary. Work machine 101 and its example automatic grading system also include certain aspects which differ or vary from those of work machine 100 a number of which are illustrated in connection with FIGS. 11-14, 15A-15E and 16A-16E and described below.

Like the automatic grading system of work machine 100, the automatic grading system of work machine 101 includes a tool mount 120 which is connected to rocker 124 by a chain 121. Rocker 124 is coupled with actuator 140 at a pivotable coupling 408 which is visible in the figures illustrating work machine 101 and described above although not visible in the figures illustrating work machine 100. Actuator 140 is also coupled with the chassis of the respective work machine 100 or 101 at a further pivotable coupling and is selectably controllable to expand and contract in the Y-axis direction effective to cause rocker 124 to rotate relative to the chassis about an axis parallel with the X-axis direction. Rocker 124 includes outer members 402 which are coupled with suspension 125. Rocker 124 also includes a shaft member 404 which extends between and is coupled with the outer members and is coupled with pivotable coupling 408. Rocker 124 further includes an actuator connector 406 which is pivotally coupled with shaft member 404 and actuator 140. Rocker 124 further includes a lifting connector 358 which is pivotally coupled with shaft member 404 and chain 121.

As described above, rotation of the rocker 124 is effective to raise and lower the tool mount 120 with the chain 121 over a first predetermined range from a maximum height to the point at which the support wheels 104, 106 contacts an underlying ground surface and are structured to ride along the underlying ground surface and limit further downward motion of the tool mount 120 and structured coupled thereto while concurrently allowing further rotation of the rocker 124 to compress or decompress the springs 126 or other elements of suspension 125. Thus, rotation of the rocker 124 is effective to vary the amount of shock absorption force applied to the tool mount 120 by varying the compression of springs 126 without substantially changing the Z-axis position of the tool mount 120. The suspension 125 accommodates movement of the tool mount in response to external force applied thereto, for example, if the tool mount contacts an obstruction such as a rock or other structure located in a soil medium being worked.

Actuator 142 is selectably controllable to expand and contract generally in the Y-axis direction effective to cause tool mount 120 to rotate relative to the work machine about an axis generally parallel with the X-axis direction as indicated by arrow RM. In this manner the pitch of the tool mount X-Y plane may be varied. This rotation can be utilized to rotate the grading tool assembly (raising one end and lowering the other) relative to the underlying ground surface and to control the force it applies to the underlying ground surface in the Z-axis direction. Tool mount 120 is further coupled with a suspension 125 by a pivotable coupling. The suspension 125 is in turn connected to rocker 124 at a pivotable coupling. Rocker 124 is further coupled with the chassis at a pivotable coupling. Tool mount 120 is further coupled with a pulling linkage 130 at a pivotable coupling which rotates generally about an axis in parallel with the X-axis direction. Pulling linkage 130 is coupled with the chassis of the work machine at a pivotable coupling which rotates about an axis in parallel with the X-axis direction. Pulling linkage is configured to provide a force vector component to the tool assembly in the forward or reverse Y-axis direction as the machine is propelled forward or backward. A force vector component generally in the Y-axis direction may also be provided, for example, during turning of the machine. Regardless of the particular direction, the pulling linkage provides one or more force vector components providing working force to the tool assembly. Furthermore, the rotation permitted by pivotable couplings between pulling linkage and the chassis of the work machine accommodates both adjustment of the height and pitch of the tool assembly relative to the X-Y plane.

The automatic grading system of work machine 101 includes a pole assembly 350 which includes an upper pole member 364, a middle pole member 363 and a lower pole member 354. Upper pole member 364 receives and is adjustably coupled with middle pole member 363 by set screws 367 permitting operator adjustment of the Z-axis position of upper pole member 364 relative to middle pole member 363. Lower pole member 354 receives and is selectably coupled with middle pole member 363 by set screws 368 permitting removal when desired. Lower pole member 354 is also slidably coupled with base member 352 and base member 352 is fixedly coupled with the chassis of work machine 101.

In the illustrated form, the slidable coupling of lower pole member 354 and base member 352 is provided by lower pole member 354 being partially inserted into a central aperture of base member 352. In other forms other types of slidable coupling between lower pole member 354 and base member 352 may be provided including, for example, base member 352 being partially inserted into a central aperture of lower pole member 354, one or more portions of lower pole member 354 being provided in or configured to engage a groove or track provided in base member 352, one or more portions of base member 352 being provided in or configured to engage a groove or track provided in lower pole member 354, or one or more wheel or roller and corresponding one or more track members being provided in, to name several examples. The slidable coupling of lower pole member 354 with base member 352 permits lower pole member 354 to move up and down in the vertical or Z-axis direction while lower pole member 354 is at the same time fixed relative to the base member in the horizontal or X-axis and Y-axis directions. Thus, lower pole member 354 is permitted to move up and down relative to the base member 352 and the chassis in the vertical or Z-axis direction in response to force applied to lower pole member 354 by arm 356, but is maintained at a fixed angle relative to the base member 352 and the chassis.

Receiver 192 is coupled with upper pole member 364 and is moveable relative to and can be fixed in place in a plurality of positions in the Z-axis direction along upper pole member 364. The relative adjustability between various ones of upper pole member 364, middle pole member 363, lower pole member 354 and receiver 192 allows the receiver 192 to be positioned relative to a reference signal source such as a rotating laser. Preferably the receiver 192 can be adjusted to synch with a laser beam by loosening set screws 367, adjusting upper pole member 364 relative to middle pole member 636, and tightening set screws 367 once the desired synch has been achieved. As described in further detail above, receiver 192 and electronic controller 195 are configured to receive and to evaluate one or more reference signals, such as signals indicating a Z-axis elevation and an angle of a rotating laser beam detected by receiver 192, and to determine actuator position adjustment commands based upon the received reference signal(s) and one or more operator-specified grading commands input to the electronic controller 195.

In the automatic grading system of work machine 101, base member 352, pole assembly 350 and receiver 192 are positioned centrally in the X-axis direction along the chassis width or wheel track of work machine 101. This central positioning reduces unintended variation in the operation of the automatic grading system that can arise under some operating conditions. For example, as work machine 101 travels back in forth in one direction laterally across a grade and then in the opposite direction laterally across the grade, the central positioning of base member 352, pole assembly 350 and receiver 192 will reduce variation in Z-axis positioning of the receiver 192 that could otherwise occur. Preferably, the central positioning is in the center 40% of the chassis width or wheel track in the X-axis direction, i.e., within +/−20% of the chassis width or wheel track relative to a chassis centerline extending in the Y-axis direction which for many applications and operations provides acceptably similar operation and error mitigation as exact center positioning. More preferably, the central positioning is in the center 10% of the chassis width or wheel track in the X-axis direction, i.e., within +/−5% of the chassis width or wheel track relative to a chassis centerline extending in the Y-axis direction which for even more applications and operations provides substantially the same or acceptably similar operation and error mitigation as exact center positioning. Even more preferably still, the central positioning is in the center 10% of the chassis width or wheel track in the X-axis direction, i.e., within +/−5% of the chassis width or wheel track relative to a chassis centerline extending in the Y-axis direction which for most if not all applications and operations provides substantially the same operation and error mitigation as exact center positioning.

Figure 12:
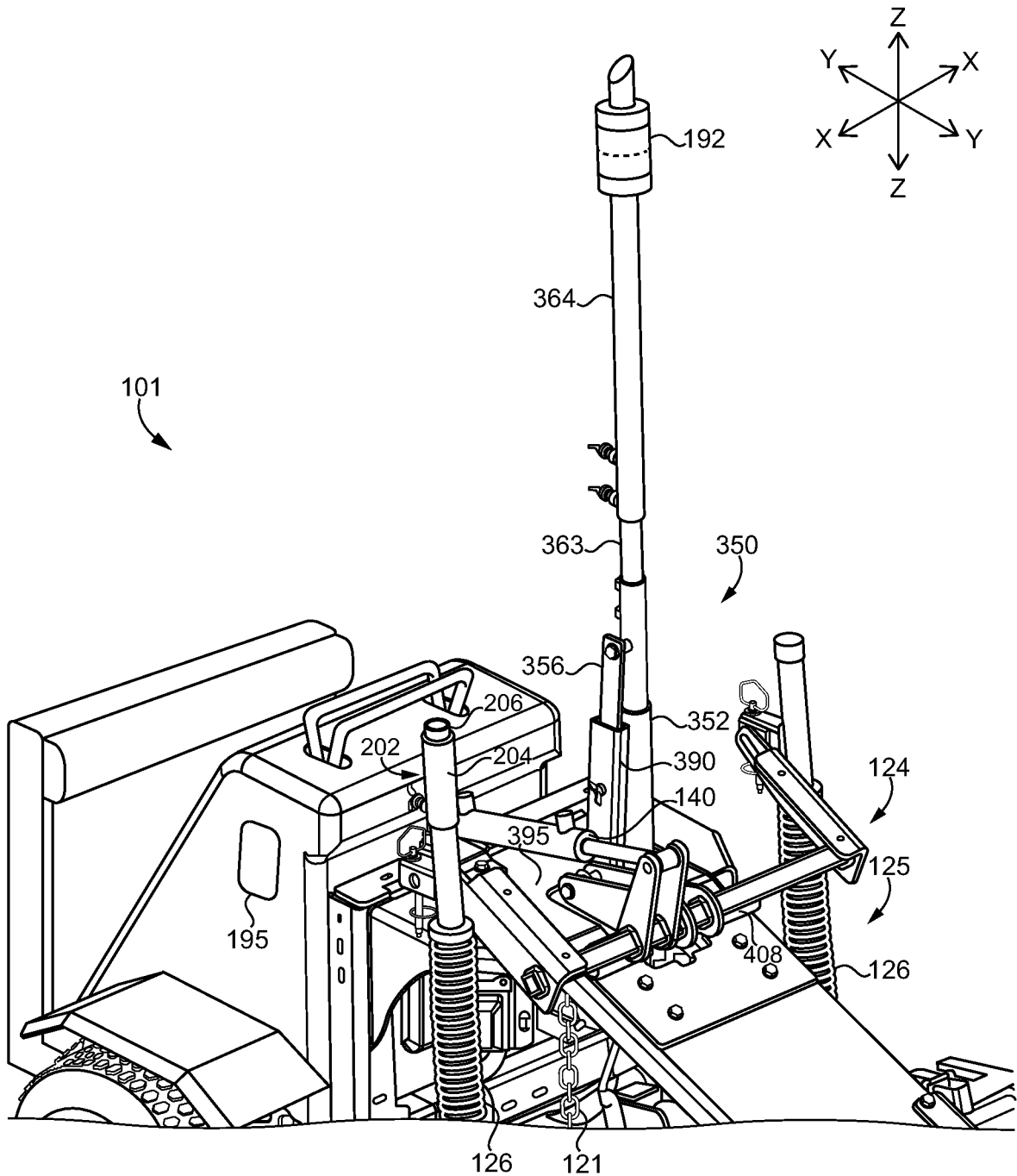
FIGS. 12-14 are perspective views illustrating certain aspects of the work machine and the automatic grading system of FIG. 11.
Figure 13:
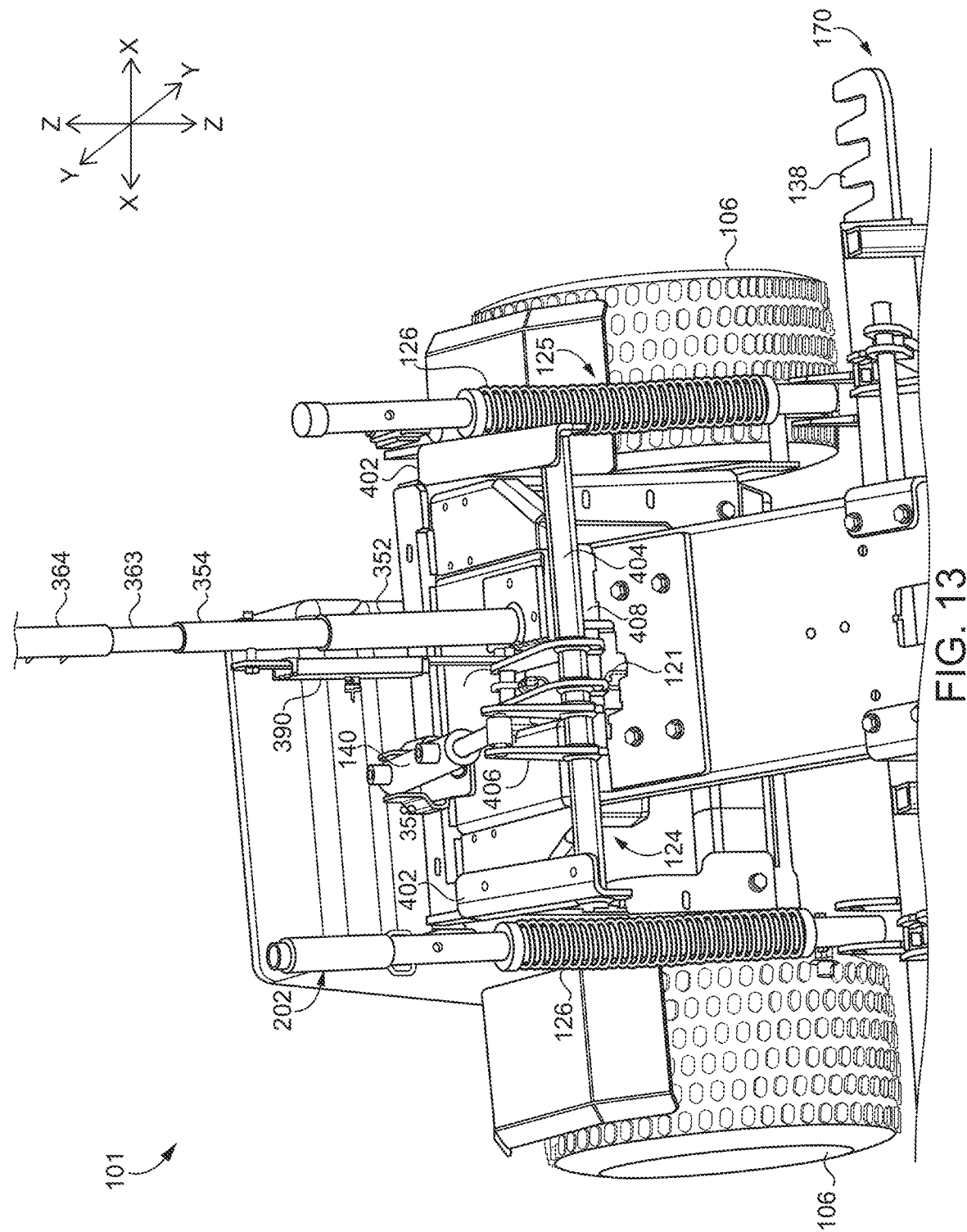
Figure 14:
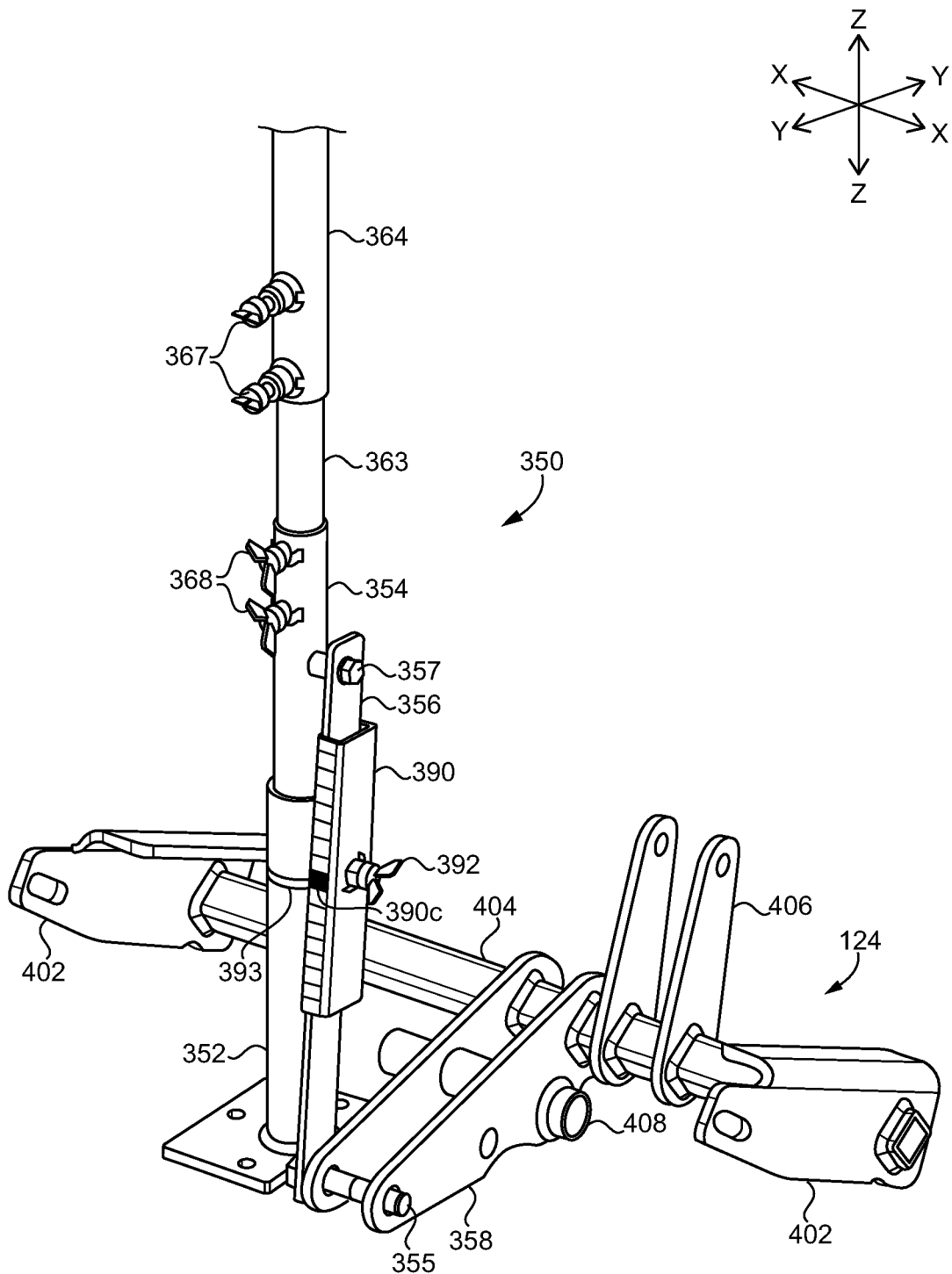

The automatic grading system of work machine 101 includes a sighting gauge 390 which is coupled with arm 356. Sighting gauge 390 can be selectably positioned by an operator along the length of arm 356 by loosening set screw 392 and positioning sighting gauge 390 relative to arm 356. After an operator achieves the desired positioning of sighting gauge 390, set screw 392 can be tightened to fix the position of sighting gauge 390 relative to arm 356. Sighting gauge 390 is provided with a scale providing an operator perceptible indication of relative positioning to a reference indicator 393 which is provided in a fixed relationship to the chassis of work machine 101. Preferably the scale is structured to indicate a measurement of cut in a direction along the scale above the middle set point of the scale and a measurement of fill in a direction along the scale below the middle set point which may be differentiated by using contrasting colors such as red and green. Such a fixed relationship may be provided, for example, by providing reference indicator 393 on base member 352 as illustrated, or by providing a reference indicator another structure in a fixed relationship with the chassis of work machine and proximate to arm 356. In some forms the reference indicator may be a surface 395 of the chassis and sighting gauge 390 may be positioned so that it is partially or completely below the surface 395. The scale includes a center position indicator 390c which a center point of the scale. As rocker 124, rotates, the Z-axis position of arm 356 and sighting gauge are varied thereby providing an operator perceptible indication of a grading set point. As illustrated in the view of FIG. 12, sighting gauge 390 may be provided in combination with sighting gauge system 202 which is described above. In other forms, only one of sighting gauge 390 and sighting gauge system 202 may be provided.

With reference to FIGS. 15A-15E there are illustrated schematic depictions of certain aspects of the automatic grading system of work machine 101 at a plurality of adjustment points over a range of adjustment. In the schematic depiction of FIGS. 15A-15E, lifting connector 358 of rocker 124 is rotatably coupled with the chassis illustrated in FIGS. 10-14 by pivotable coupling 408 at a point of rotation 359, it being appreciated that certain elements have been omitted from the schematic depictions of FIGS. 15A-15E for clarity of illustration and that the geometry of lifting connector 358 has been simplified in the schematic views for clarity of illustration. Additionally, in the schematic depictions of FIGS. 15A-15E, portions of pole assembly 350 extending above lower pole member 354 have been omitted for simplification and clarity of illustration. It shall nevertheless be appreciated that the elements of pole assembly 350 illustrated and described in connection with FIGS. 10-14 and 16A-16E are adjustably fixedly coupled with an extend above lower pole member 354 and move in a vertical or Z-axis direction in a substantially fixed relationship with lower pole member 354 over its range of motion in the vertical or Z-axis direction.

With continuing reference to FIGS. 15A-15E lifting connector 358 is rotatable relative to the chassis about a pivotable coupling at a point of rotation 359. Lifting connector 358 is also rotatably coupled with arm 356 by pivotable coupling 355 and rocker 385 and arm 356 are rotatable relative to one another about a pivotable coupling at a point of rotation 355. Arm 356 is also rotatably coupled with lower pole member 354 by pivotable coupling that is rotatable relative to lower pole member 354 about a third point of rotation 357. Considering FIGS. 15A-15E in sequence, it can be seen that the first point of rotation provided by rotatably member 359 remains substantially fixed relative to the chassis as lifting connector 358 rotates while the second point of rotation provided by rotatably member 355 travels along a curved path. As a result of such rotation, a vertical or Z-axis direction force component is applied by arm 356 to lower pole member 354. Through this mechanism, rotational motion of lifting connector 358 is translated into linear motion of lower pole member 354 in a vertical or Z-axis direction. Such translation may result in some amount of lost motion between the lifting connector 358 and the lower pole member 354. The amount of lost motion at a minimum in the position illustrated in FIG. 15B when the arm is substantially aligned with the moveable member.

With reference to FIG. 16A-16E there are illustrated schematic depictions of certain aspects of work machine 101 and its example automatic grading system at a plurality of adjustment points over a range of adjustment. It shall be appreciated that the adjustment positions illustrated in FIGS. 16A-16E correspond generally to the adjustment positions in FIGS. 15A-15E, respectively, although minor variations are present between the two sets of figures due to the schematic nature of FIGS. 15A-15E.

Figure 16A:
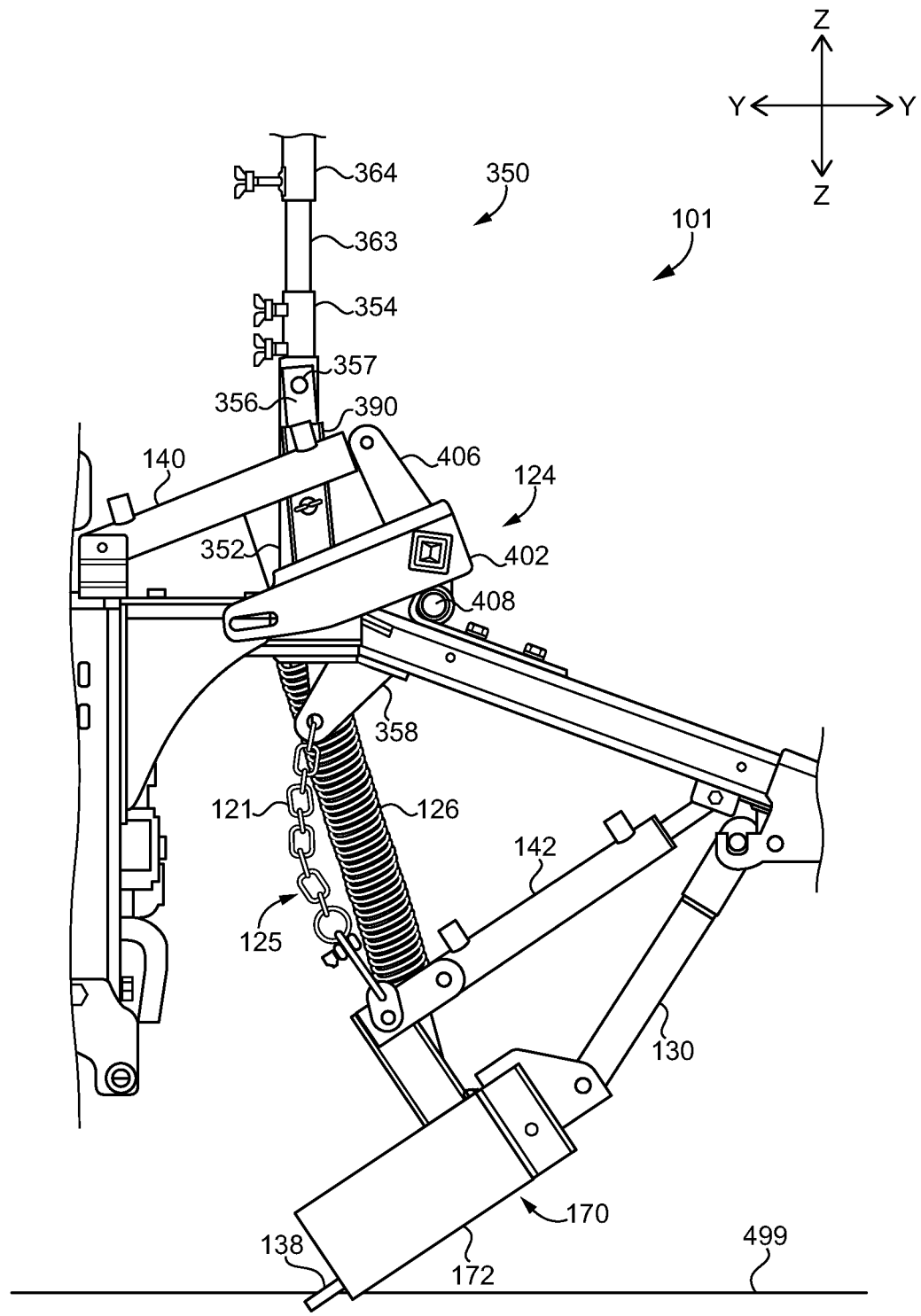
FIGS. 16A-16E are side views of certain aspects the automatic grading system of FIG. 11 in different states of adjustment.

In the adjustment position of FIG. 16A, finishing box 170 and finishing comb 138 of the grading tool assembly coupled with tool mount 120 are in contact with and penetrate into the underlying ground surface 499. Furthermore, the rotation of rocker 124 is such that the suspension 125 is compressed to a substantially maximum amount. In the adjustment position of FIG. 16B, finishing box 170 and finishing comb 138 of the grading tool assembly coupled with tool mount 120 are also in contact with and penetrate into the underlying ground surface 499. In this adjustment position however, the rotation of rocker 124 is such that the suspension 125 is compressed to a less than substantially maximum amount.

Figure 16B:
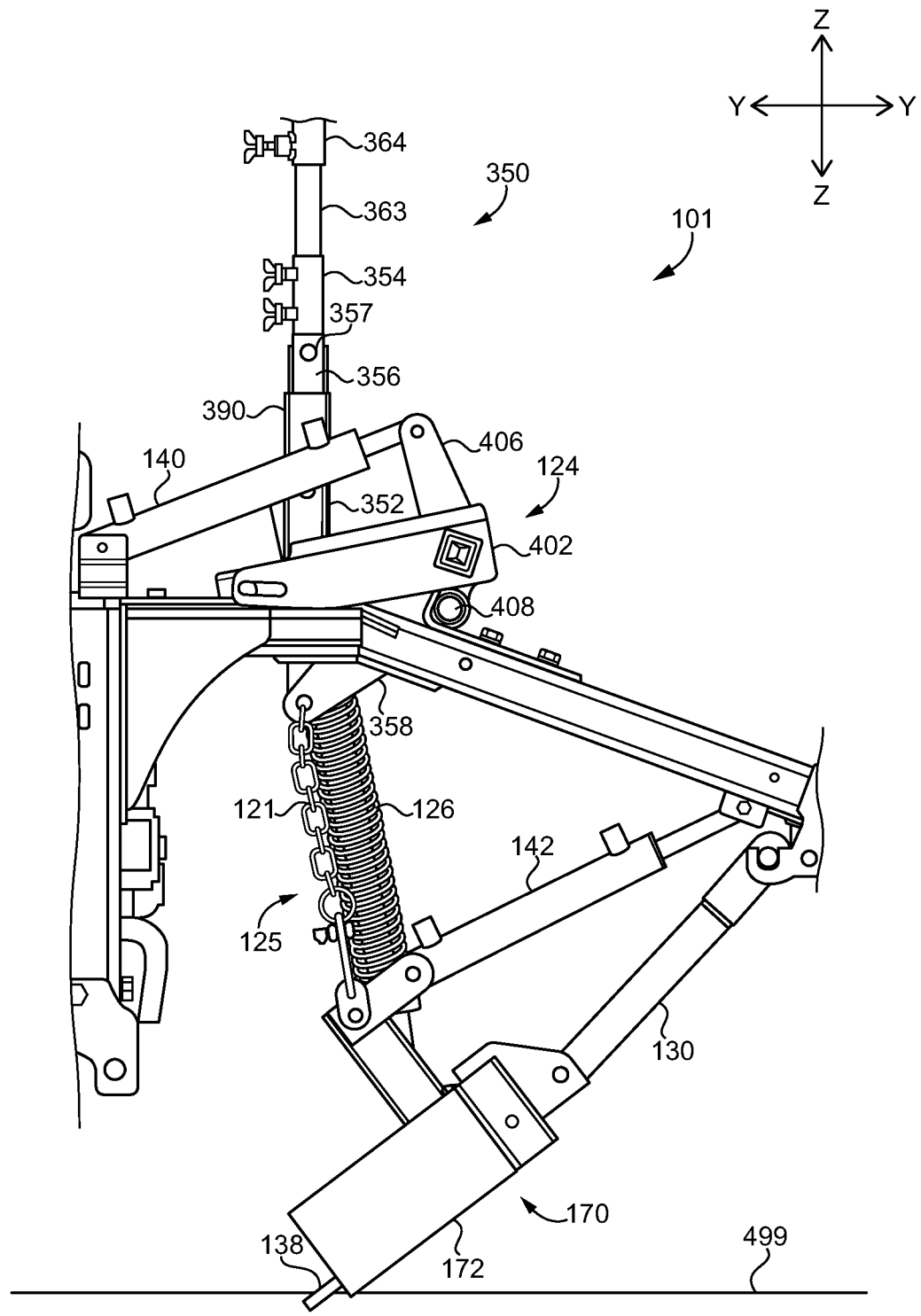

Considering adjustment positions of FIGS. 16A and 16B as example positions over a range of rotation of rocker 124, it can be seen that rotation of the rocker 124 over such a range of rotation is effective to de-couple adjustment of the receiver 192 and the grading tool assembly and to vary the predetermined spacing relationship of the receiver 192 and the grading tool assembly due to compression of the suspension 125 with the grading tool assembly in contact with the underlying ground surface 499. It shall be appreciated that such a range of rotation may include adjustment positions within bounds of the position of FIGS. 16A and 16B as well as positions outside these bounds up to positions at which compression of the suspension 125 occurs due to adjustment of the rocker 125.

Figure 16C:
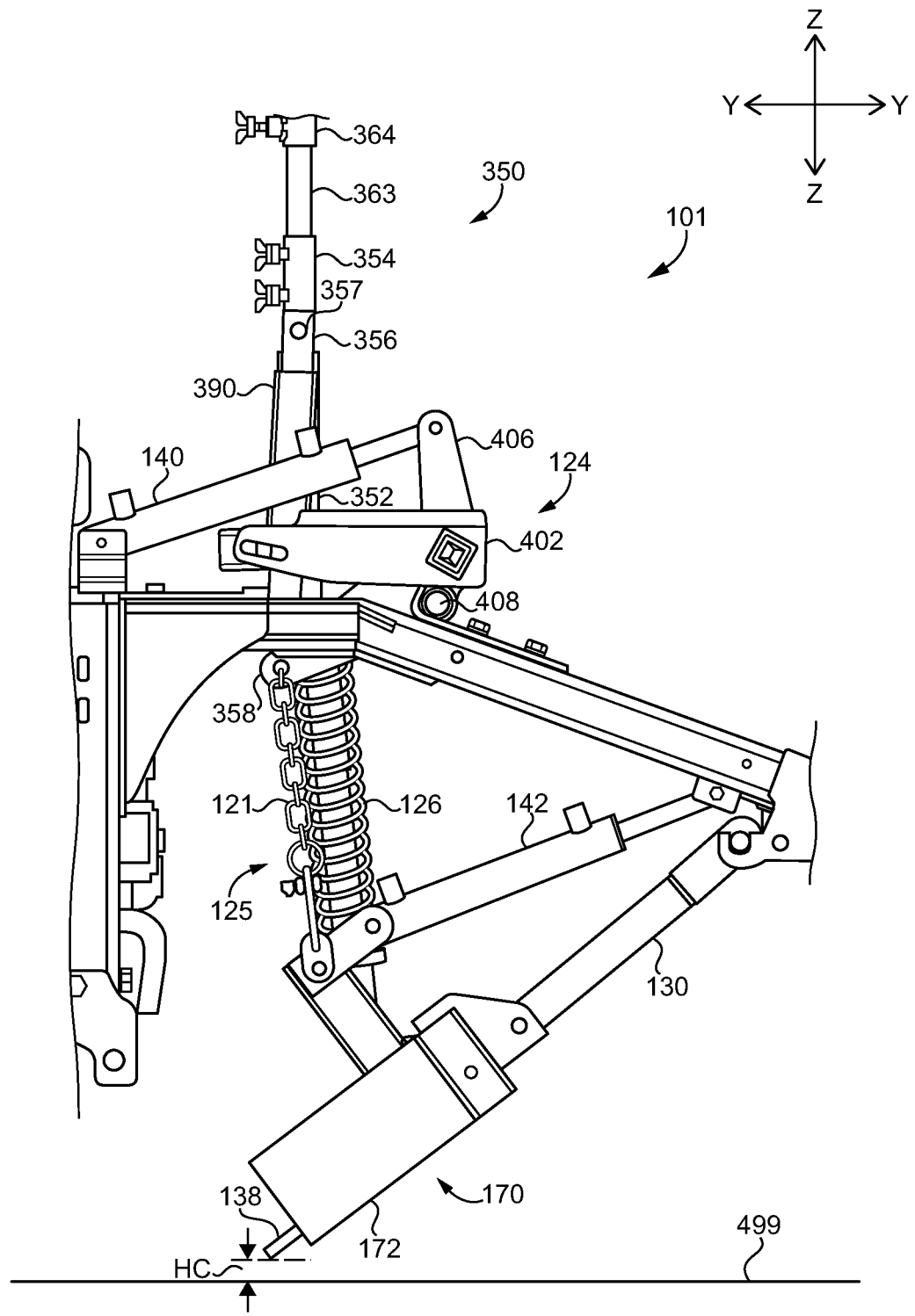

In the adjustment position of FIG. 16C, the rotation of rocker 124 is such that finishing box 170 and finishing comb 138 of the grading tool assembly coupled with tool mount 120 are raised above the underlying ground surface 499 by a height HC in the Z-axis direction. In the adjustment position of FIG. 16D, the rotation of rocker 124 is such that finishing box 170 and finishing comb 138 of the grading tool assembly coupled with tool mount 120 are raised above the underlying ground surface 499 by a height HD in the Z-axis direction. In the adjustment position of FIG. 16E, the rotation of rocker 124 is such that finishing box 170 and finishing comb 138 of the grading tool assembly coupled with tool mount 120 are raised above the underlying ground surface 499 by a height HE in the Z-axis direction. In the adjustment positions of FIGS. 16C-16E, the rotation of rocker 124 is such that the suspension 125 is compressed to a substantially minimum amount, which may be substantially zero compression or a non-zero preload of compression. Furthermore, in these adjustment positions the rotation of rocker 124 is such that chain 121 exerts a lifting force effective to maintain the grading tool assembly raised above the underlying ground surface 399.

Figure 16D:
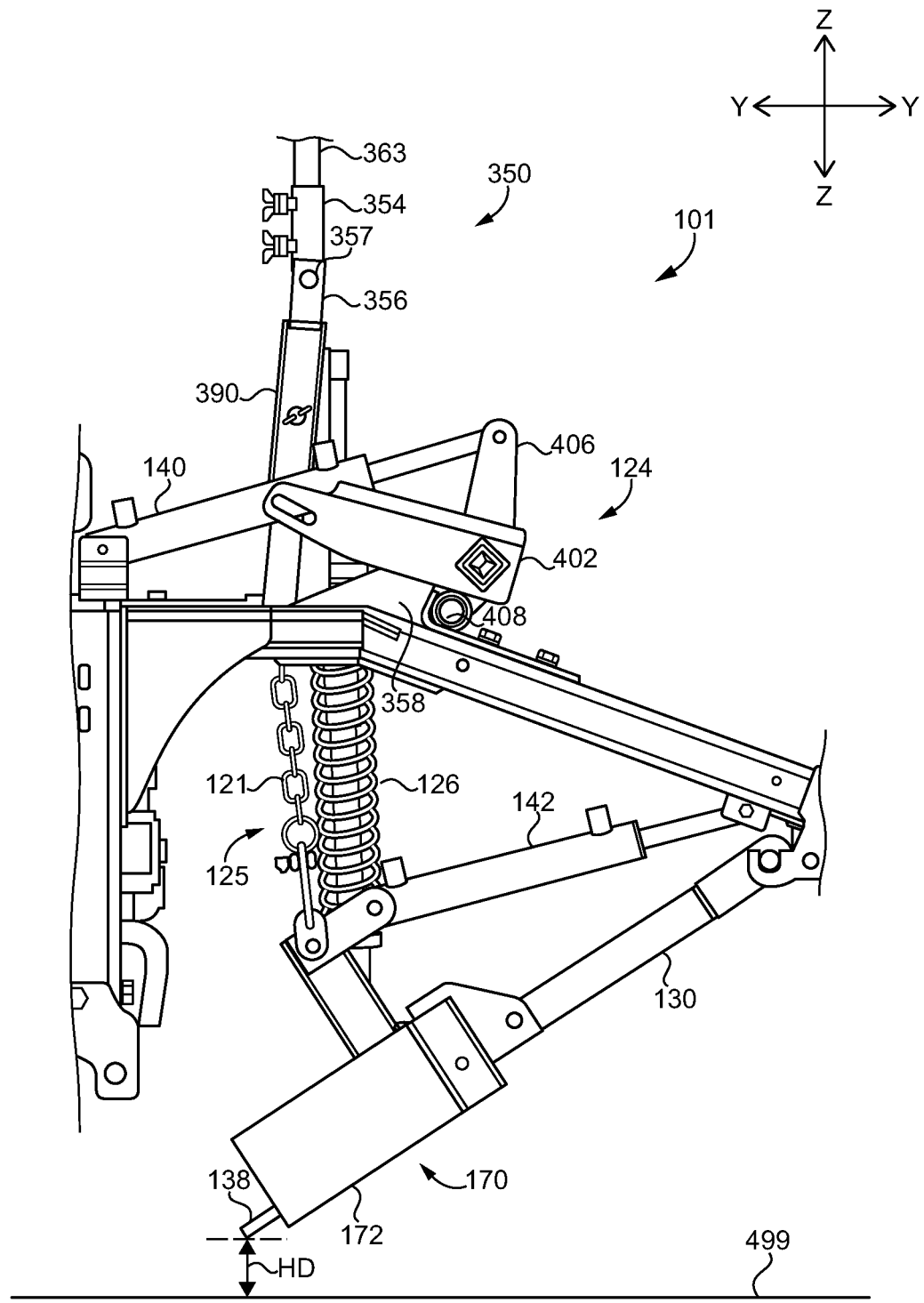
Figure 16E:
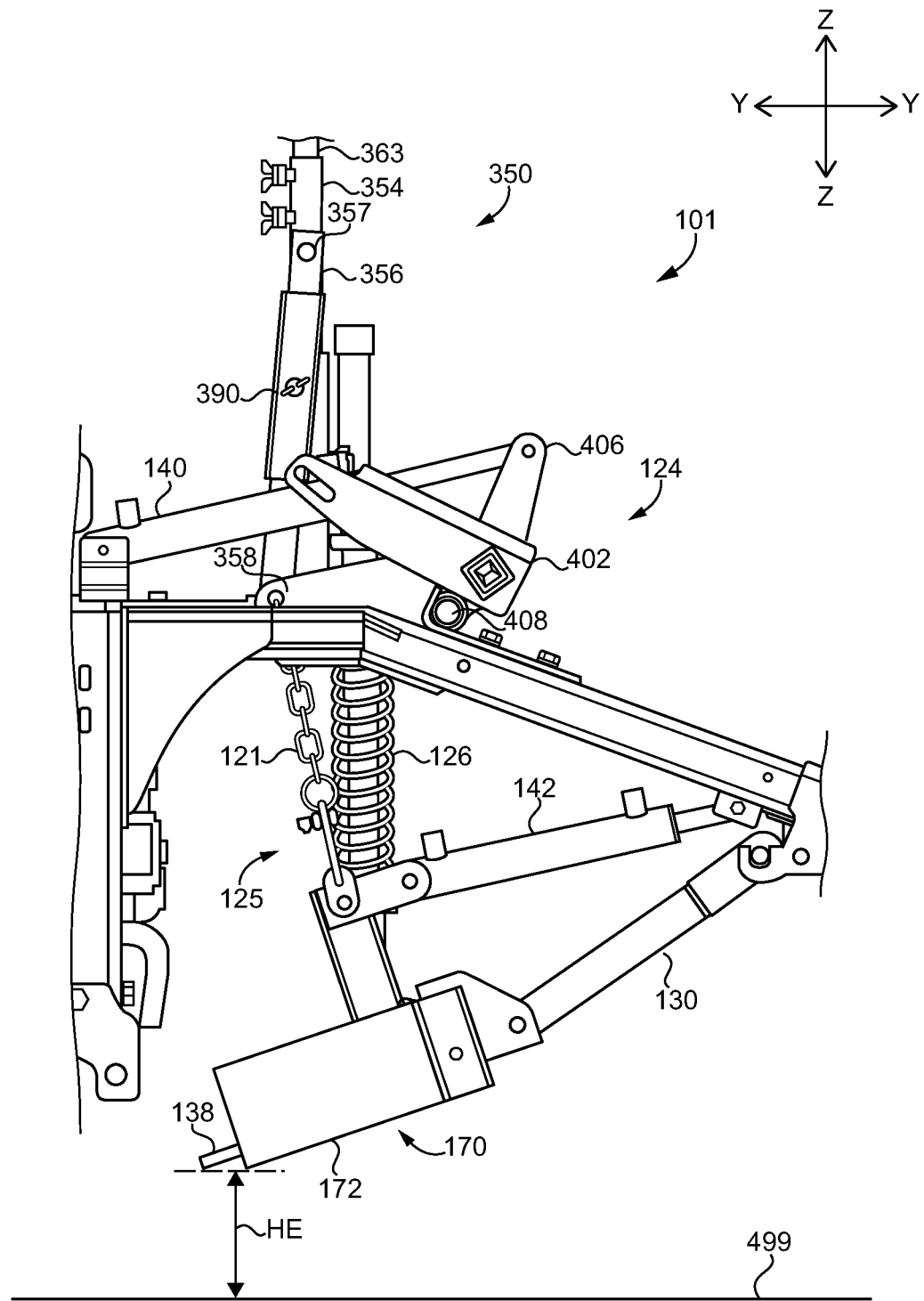

Considering the adjustment positions illustrated in FIGS. 16C, 16D and 16E as example positions over another range of rotation of rocker 124, it can be seen that rotation of rocker 124 over a first range of rotation is effective to adjust the Z-axis position of the pole assembly 350 including receiver 192 and tool mount 120 including the grading tool assembly as a coupled pair with a predetermined spacing relationship of the receiver 192 and the grading tool assembly with the grading tool assembly spaced apart from an underlying ground surface 499. It shall be appreciated that such a range of rotation may include intermediate adjustment positions within bounds of the position of FIGS. 16C and 16E in addition to the intermediate position 16D and may also include positions outside these bounds up to positions at the suspension 125 is minimally compressed due to adjustment of the rocker 125.

Work machines 100 and 101 and their respective automatic grading systems may be utilized in performing surveying operations to assess the amount of grade material that needs to be added or removed from various locations about a work site. In certain surveying operations, an operator may adjust the components of the automated grading system such that the grading tool assembly is raised above the underlying ground surface when the receiver is in a target grade position (e.g., a desired elevation and/or angle) and the grading tool assembly remains raised above the underlying ground surface over a range of motion in the Z-axis direction corresponding to the range of adjustment of the receiver in the Z-axis detection by electronic controller. This positioning may be selected to account for estimated variation in the underlying ground surface for a given worksite. An operator may further position one or more sighting gauge components to provide an operator perceptible indication of movement above and below the target grade position, for example, by setting the relationship between center position indicator 390c and reference indicator 393.

By way of example, an operator may conduct a survey operation by configuring and operating work machine 100 or work machine 101 as follows. The operator may manipulate the Z-axis position of the grading tool assembly such that it is raised above the underlying ground surface to an expected neutral point. For example, a neutral point may be selected by positioning the work machine at a position believed to be close to a target grade and adjusting the Z-axis position to be at a predetermined position between the underlying ground surface and its maximum upper Z-axis position.

If the work site is estimated to have fill and cut regions with generally the same magnitude of variation from a target grade, the predetermined position may be selected at a midpoint position between the underlying ground surface and the maximum upper Z-axis position of the grading tool assembly. The predetermined position may also be selected to be higher or lower than the midpoint position if a worksite is estimated to have cut regions with a greater magnitude of variation from a target grade than its fill regions or to have fill regions with a greater magnitude of variation from a target grade than its cut regions.

In the grading system of work machine 101, the expected neutral point may additionally or alternatively be selected such that the arm 356 is substantially parallel to the Z-axis direction or substantially aligned with base member 352. Such positioning may be selected to minimize a Z-axis lost motion effect exhibited by arm 356 at the neutral point due to the translation of rotational motion of rocker 124 to Z-linear motion of pole assembly 350.

With the Z-axis position of the grading tool assembly established, the operator may then adjust the Z-axis position of receiver 192 to be substantially at the midpoint of its detection range in the Z-axis direction relative to a wireless reference signal such as a laser beam. This adjustment may be performed by adjusting the position of the receiver 192 relative to positioning pole 194 or pole assembly 350, by adjusting the relative positioning between one or more of the upper pole member 364, middle pole member 363 and a lower pole member 354 to vary the length of the pole assembly 350 or by various combinations of such adjustments.

With the Z-axis position of the grading tool assembly and the Z-axis position of the receiver 192 established, the operator may adjust position of a sighting gauge component to provide an operator perceptible indication that the receiver is at the target grade. Sighting gauge 390 may be adjusted relative to arm 356 such that scale providing an operator perceptible indication of target grade positing relative to reference indicator 393 for example, by aligning center position indicator 390c with reference indicator 393. Sighting gauge system 202 may be adjusted to indicate a degree of compression of the suspension spring by aligning the top of inner member 206 or 306 with the top of outer member 204 or 304 to indicate a zero compression state of the suspension spring and indicating an amount of cut to achieve a desired grade through the extension of inner member 206 or 306 with the top of outer member 204 or 304 corresponding to the degree of compression of the suspension spring.

With the Z-axis position of the grading tool assembly, the Z-axis position of the receiver 192 and the sighting gauge position established, the operator may pilot the work machine around the work area and observe and notate the grade information indicated by the sighting gauge. For example, the volume of a fill region may be estimated by observing the fill depth indicated by the sighting gauge over a known or determined area of travel. Similarly, the volume of a cut region may be estimated by observing the cut depth indicated by the sighting gauge over a known or determined area of travel. Furthermore, the filling and grading regions for a given area can be substantially fully determined or mapped by piloting the work machine over the work area and observing and notating the cut or fill depths of the sighting gauge. Through use of such techniques an operator can rapidly survey a work area and estimate a volume of fill needed for the worksite and/or a volume of cut available for use at the worksite or which may require transport away from the worksite.

With reference to FIGS. 17-24, there are illustrated several views depicting certain aspects of an example work machine 101' operatively coupled with an example automatic grading system. Work machine 101' and its example automatic grading system include a number of features that are the same as or similar to the features described above in connection with work machine 101, work machine 100, and their respective automatic grading systems. A number of such features are indicated with like reference numerals and the description of such features in connection with work machine 101 or work machine 100 shall be understood to apply, mutatis mutandis, to the work machine 101'. While some such features are labeled with like reference numerals or otherwise illustrated in the drawings, it shall be appreciated that other aspects, alternatives, and variations described or illustrated in connection with work machine 101, work machine 100, and their respective automatic grading systems, is also applicable to at least some forms and embodiments of work machine 101' unless expressly or impliedly indicated to the contrary.

Work machine 101' and its example automatic grading system also include certain aspects which differ or vary from those of work machine 101, work machine 100, and their respective automatic grading systems, a number of which are illustrated in connection with FIGS. 17-24. In one such aspect, the automatic grading system of work machine 101' comprises multiple actuators which are operatively coupled to respective suspension elements, are configured and operable to be automatically controlled, independently or in combination, in response to control signals from electronic controller 495, and are configured and operable to be manually controlled, independently or in combination, in response to control signals from operator controls 150'.

In the illustrated embodiment, the electronic controller 495 is in operative communication with a first actuator 440a, a second actuator 440b, and a receiver 492. The receiver 492 is operable to receive a wireless signal including positional information, also referred to as a positional information signal, and to provide the positional information signal or positional information thereof to electronic controller 495. The positional information signal may be provided in a number of forms interpretable by the electronic controller to determine or judge a position of the work machine. The positional information signal may comprise a global navigation satellite system (GNSS) signal, for example, a global positioning system (GPS) signal, a Galileo system signal, or other signals from other global or regional satellite systems or sources. The positional information signal may additionally or alternatively comprise a local positioning system (LPS) signal. A number of LPS may be utilized to provide such signals including indoor or in-structure systems and worksite systems. In some embodiments, an LPS signal may be provided by a total station (TS) or total station theodolite (TST) system. Such TS or TST systems comprising electronic and/or optical instrumentation which may comprise an electronic transit theodolite integrated with electronic distance measurement (EDM) to measure both vertical and horizontal angles and the slope distance from the instrument to a particular point, and an on-board computer to collect data and perform triangulation calculations.

In response to the positional information signal, the electronic controller 495 is configured and operable to automatically control the first actuator 440a and the second actuator 440b, independently or in combination or coordination with one another. The operator controls 150' are also in operative communication with the first actuator 440a and the second actuator 440b and can provide control signals in response to operator input to manually control the first actuator 440a and the second actuator 440b, independently or in combination or coordination with one another.

The first actuator 440a is operatively coupled with a first rocker 424a at a pivotable coupling 506a. The first rocker 424a is further operatively coupled with the chassis at a pivotable coupling 508a. The first actuator 440a is also coupled with the chassis of the work machine 101' at a pivotable coupling and is controllable by the electronic controller 495 and by the operator controls 150' to selectably expand and contract generally in the Y-axis direction effective to cause the first rocker 424a to rotate relative to the chassis at the pivotal coupling 508a about an axis generally parallel with the X-axis direction. The first rocker 424a includes a first outer arm member 502a which is coupled with a first suspension element 125a. The first rocker 424a also includes a first shaft member 504a which extends between and is coupled with the first outer arm member 502a and the first pivotable coupling 508a. The first rocker 424a further includes a first inner arm member 503a which is coupled with and extends between the pivotable coupling 506a and the pivotable coupling 508a. The first rocker 424a includes a first lifting arm member which is coupled with the first shaft member 504a and a first portion of the flexible rigging 421 which comprises a chain in the illustrated embodiment and may comprise a cable or other flexible rigging members in other embodiments.

Rotation of the first rocker 424a over a first range of motion is effective to raise or lower at least a first portion of the tool mount 120 in the Z-axis direction. In some forms, the first portion of the tool mount 120 comprises at least the first side (e.g., X-axis direction end or extremity) of the tool mount 120. In some forms, the first portion of the tool mount 120 comprises at least a first widthwise portion of the tool mount 120 extending intermediate the first side of the tool mount 120 and position at which the tool mount 120 is coupled with the flexible rigging 421. In some forms, the first portion of the tool mount 120 comprises at least a second widthwise portion of the tool mount 120 extending intermediate the first side of the tool mount 120 and position at which the tool mount 120 is coupled with the second suspension element 125b. The raising and lowering can be effectuated or provided by a lifting connection provided between the first lifting arm member, a first portion of the flexible rigging 421, and the tool mount 120, and can occur over a first predetermined range between a maximum height and a ground-contacting point at which the tool mount 120 or a tool coupled therewith contacts an underlying ground surface in a manner which limit further lowering or downward or Z-axis motion of the tool mount 120 and a tool coupled thereto.

From the ground contacting point, further rotation of the first rocker 424*a* may be performed over a second range of motion to compress or decompress the first spring 126*a* or other compressible suspension component(s) of the first suspension element 125*a* from the ground contacting point to a maximum compression point. Thus, rotation of the first rocker 424*a* may be performed to vary the amount of shock absorption force applied to the tool mount 120 by varying the compression of the first spring 126*a* without substantially changing the Z-axis position of at least the first portion of the tool mount 120. Depending on the degree of compression of the first spring 126*a*, the first suspension element 125*a* can also accommodate movement of the tool mount 120 in response to external force applied thereto, for example, if the tool mount 120 contacts an obstruction such as a rock or other structure located in a soil medium being worked.

The second actuator 440*b* is operatively coupled with a second rocker 424*b* at a pivotable coupling 506*b*. The second rocker 424*b* is further operatively coupled with the chassis at the pivotable coupling 508*b*. The second actuator 440*b* is also coupled with the chassis of the work machine 101' at a pivotable coupling and is by the electronic controller 495 ant the operator controls 150' to selectably expand and contract generally in the Y-axis direction effective to cause the second rocker 424*b* to rotate relative to the chassis at the pivotal coupling 508*b* about an axis generally parallel with the X-axis direction. The second rocker 424*b* includes a second outer arm member 502*b* which is coupled with a second suspension element 125*b*. The second rocker 424*b* also includes a second shaft member 504*b* which extends between and is coupled with the second outer arm member 502*b* and the second pivotable coupling 508*b*. The second rocker 424*b* further includes a second inner arm member 503*b* which is coupled with and extends between the pivotable coupling 506*b* and the pivotable coupling 508*b*. The second rocker 424*b* includes a second lifting arm member which is coupled with the second shaft member 504*b* and a second distal portion of the flexible rigging 421.

Rotation of the second rocker 424*b* over a first range of motion is effective to raise or lower at least a second portion of the tool mount 120 in the Z-axis direction. In some forms, the second portion of the tool mount 120 comprises at least the second side (e.g., X-axis direction end or extremity) of the tool mount 120. In some forms, the second portion of the tool mount 120 comprises at least a first widthwise portion of the tool mount 120 extending intermediate the second side of the tool mount 120 and position at which the tool mount 120 is coupled with the flexible rigging 421. In some forms, the second portion of the tool mount 120 comprises at least a second widthwise portion of the tool mount 120 extending intermediate the second side of the tool mount 120 and position at which the tool mount 120 is coupled with the first suspension element 125*a*. The raising and lowering can be effectuated or provided by a lifting connection provided between the second lifting arm member, a second portion of the flexible rigging 421, and the tool mount 120, and can occur over a second predetermined range between a maximum height and a ground-contacting point at which the tool mount 120 or a tool coupled therewith contacts an underlying ground surface in a manner which limit further lowering or downward or Z-axis motion of the tool mount 120 and a tool coupled thereto.

From the ground contacting point, further rotation of the second rocker 424*b* may be performed over a second range of motion to compress or decompress the second spring 126*b* or other compressible suspension component(s) of the second suspension element 125*b* from the ground contacting point to a maximum compression point. Thus, rotation of the second rocker 424*b* may be performed to vary the amount of shock absorption force applied to the tool mount 120 by varying the compression of the second spring 126*b* without substantially changing the Z-axis position of at least the first portion of the tool mount 120. Depending on the degree of compression of the second spring 126*b*, the second suspension element 125*b* can also accommodate movement of the tool mount 120 in response to external force applied thereto, for example, if the tool mount 120 contacts an obstruction such as a rock or other structure located in a soil medium being worked.

Figure 17:
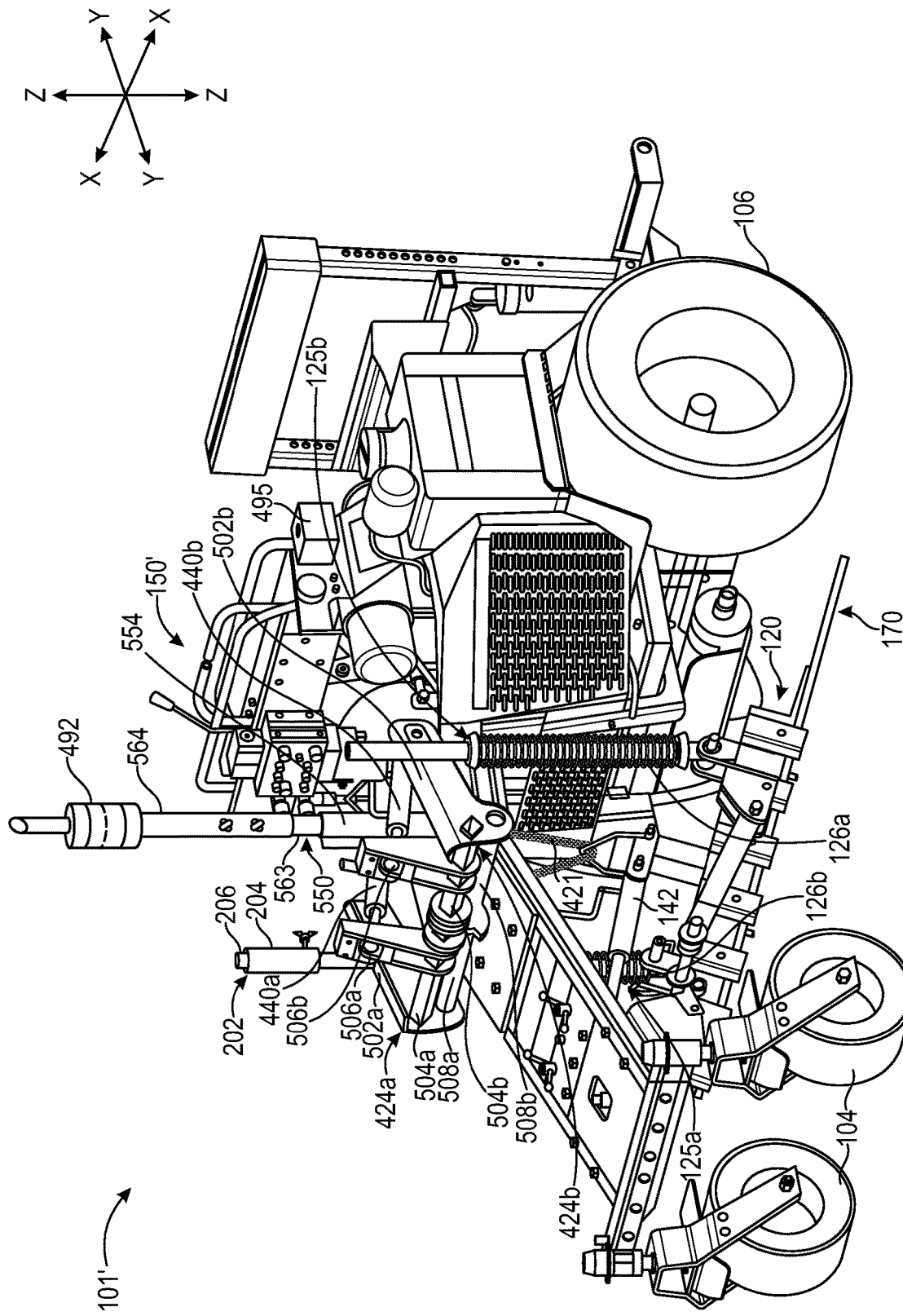
FIG. 17 is a perspective view illustrating certain aspects of an example work machine including an automatic grading system in a first state of adjustment.
Figure 18:
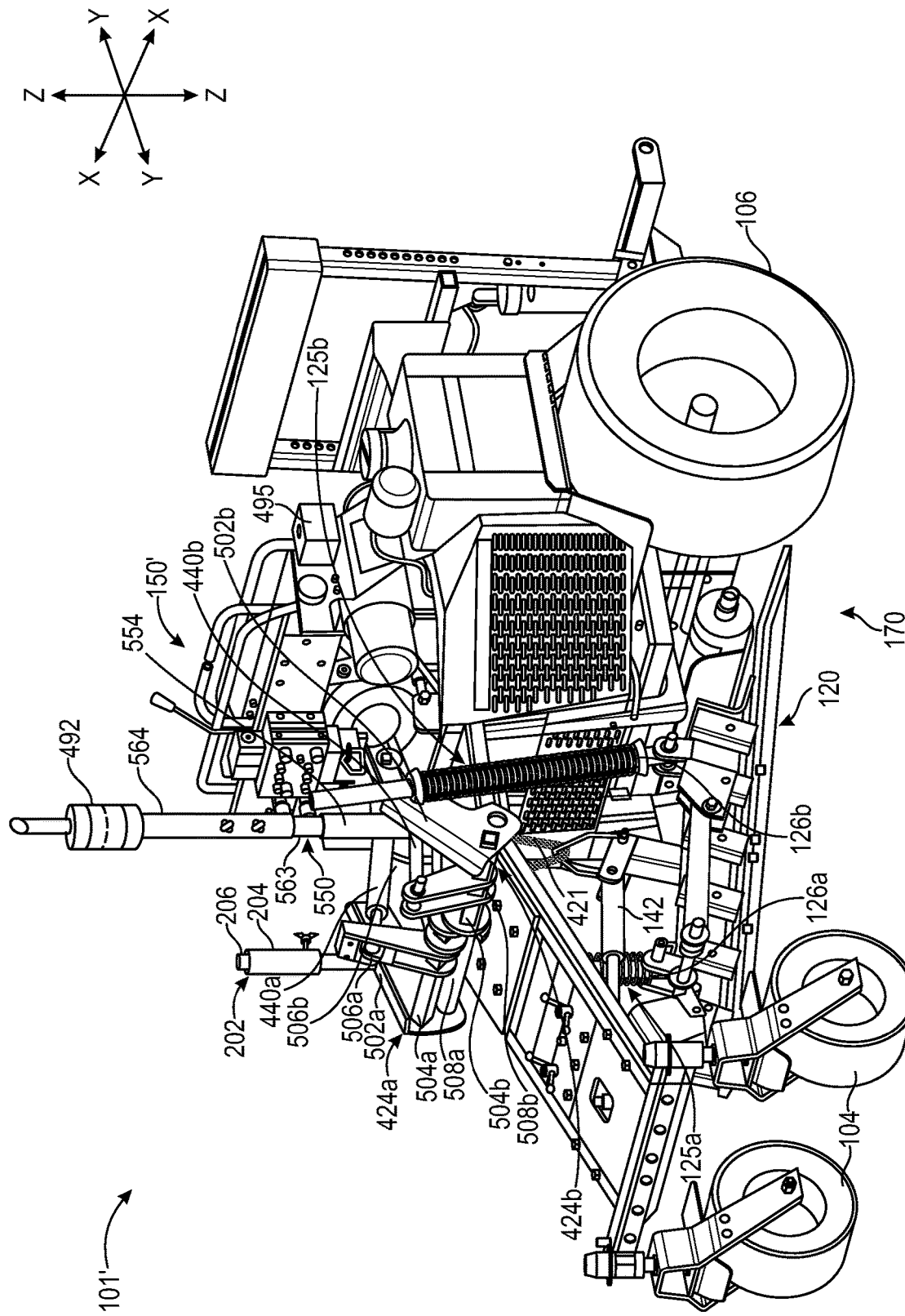
FIG. 18 is a perspective view illustrating certain aspects of the example work machine of FIG. 17 in a second state of adjustment.
Figure 19:
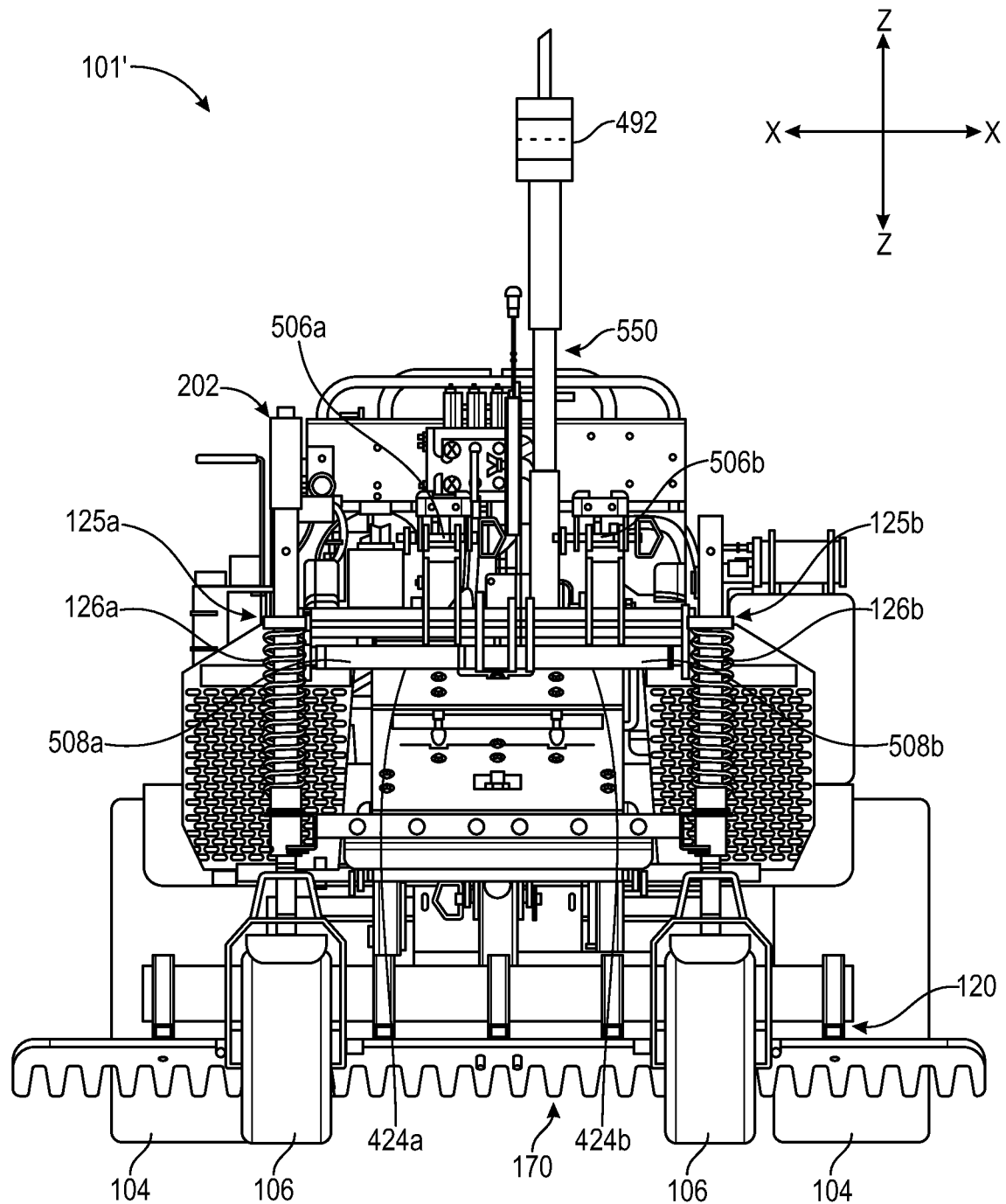
FIG. 19 is a front view of the example work machine of FIG. 17 in the first state of adjustment.
Figure 20:
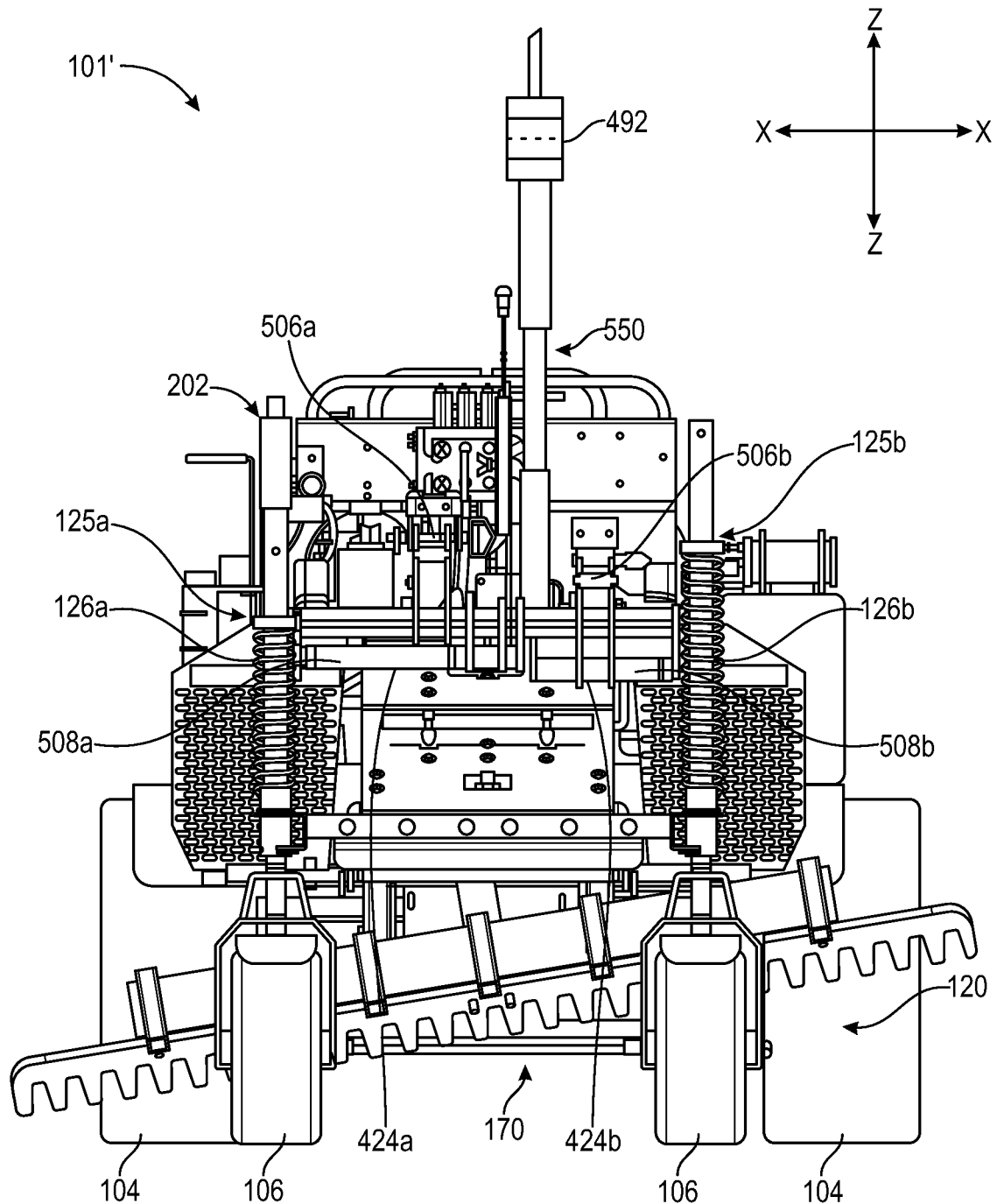
FIG. 20 is a front view of the example work machine of FIG. 17 in the second state of adjustment.
Figure 21:
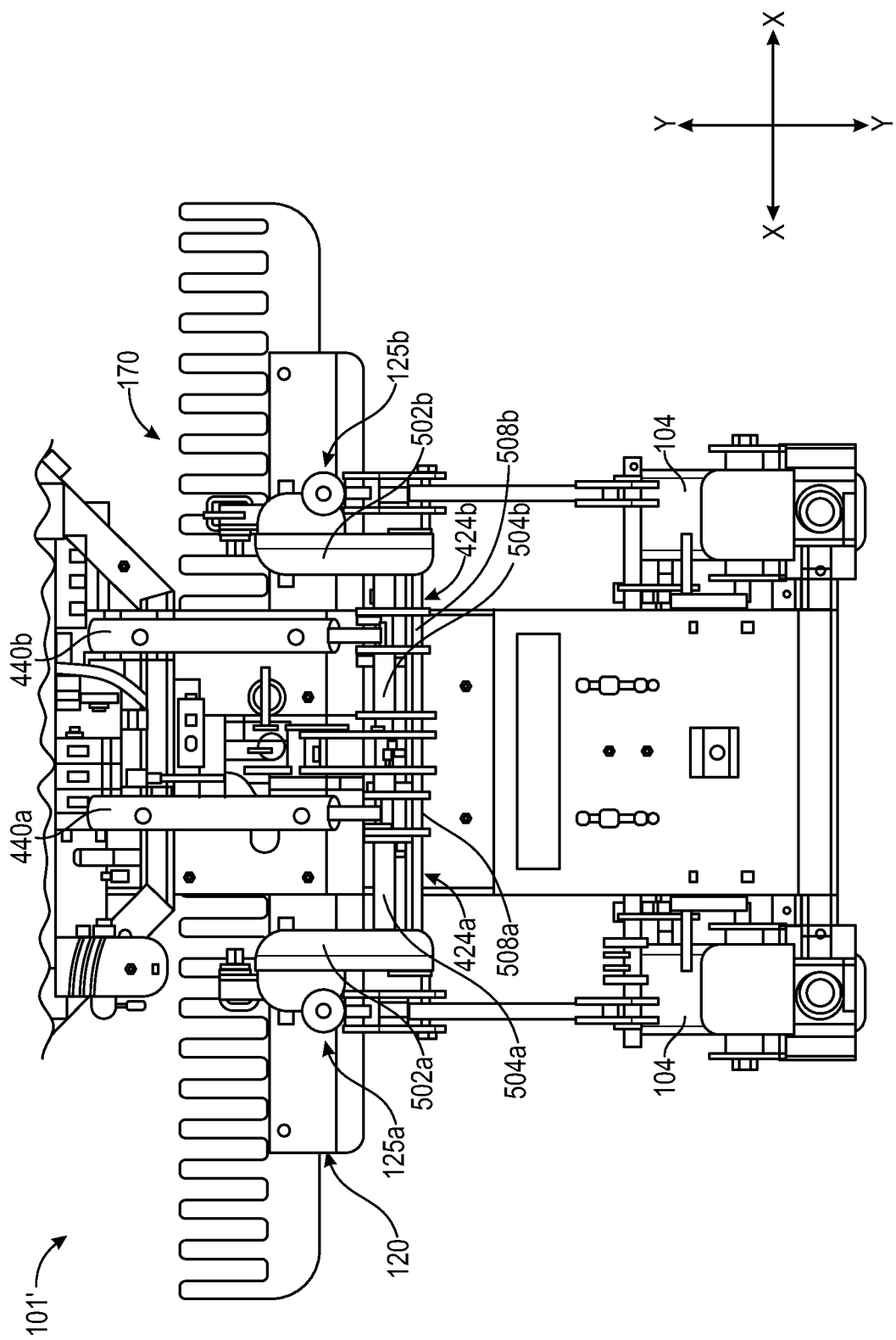
FIG. 21 is a top view of a portion of the example work machine of FIG. 17 in the first state of adjustment.
Figure 22:
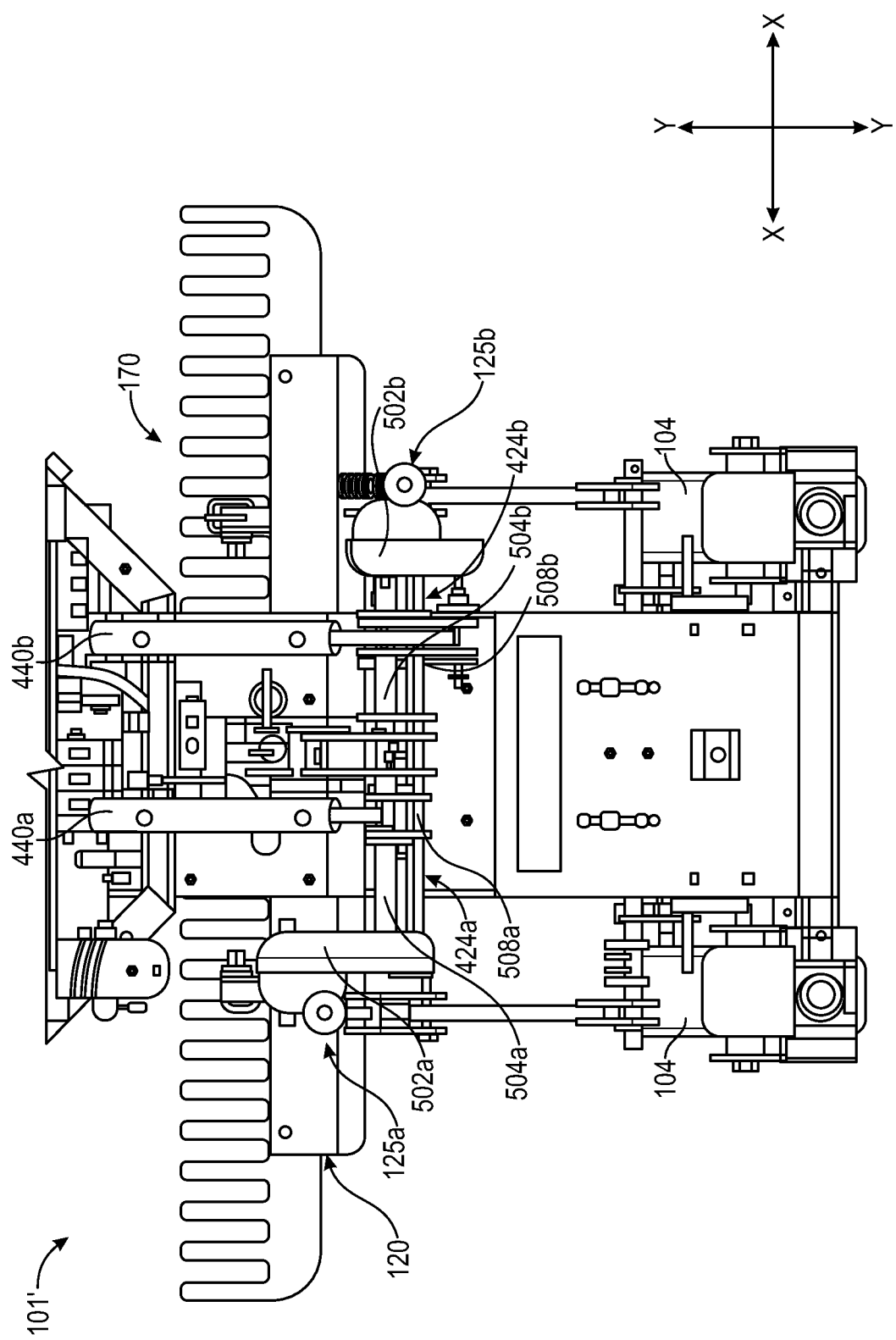
FIG. 22 is a top view of a portion of the example work machine of FIG. 17 in the second state of adjustment.

The first actuator 404*a* and the second actuator 440*b* may be controlled concurrently or sequentially to equivalent adjustment positions to emulate the operation of a single actuator such as actuator 140 of work machine 100 or work machine 101. FIGS. 17, 19, and 21 illustrate such a state of adjustment wherein the tool mount 120 is flat or biased toward the same Z-axis position over its width extending in the X-axis direction and any tools coupled with the tool mount 120 are similarly biased or positioned. In other such states of adjustment, the tool mount 120 may be flat or biased toward other common Z-axis positions with the tool mount 120 and one or more tools as may be coupled therewith provided at or biased toward a different Z-axis position above or below the position illustrated in FIGS. 17, 19, and 21.

The first actuator 404*a* and the second actuator 440*b* may be controlled concurrently or sequentially to different adjustment positions to provide lateral tilting (also referred to as side-to-side or widthwise tilting) of the tool mount 120 and one or more tools as may be coupled therewith. FIGS. 18, 20, 22, 23, and 24 illustrate such as state of adjustment wherein the tool mount 120 is provided at or biased toward different Z-axis position along its width and any tools coupled with the tool mount 120 are similarly biased or positioned. Furthermore, in such states of adjustment, the first spring 126*a* and the second spring 126*b* are compressible either separately and independently or in combination but to different degrees to vary the side-to-side or widthwise tilt of the tool mount 120 without adjustment of the first actuator and without adjustment of the second actuator.

In other such states of adjustment, the tool mount 120 may be laterally tilted or biased toward different Z-axis positions which are respectively above or below the position illustrated in FIGS. 18, 20, 22, 23, and 24, and may be laterally tilted at different angles greater or lesser than the illustrated lateral tilt angles ranging from a first maximum tilt position wherein a first lateral end of the tool mount is at a maximum Z-axis position and a second lateral end of the tool mount is at a minimum Z-axis position to a second maximum tilt position wherein the first lateral end of the tool mount is at a minimum Z-axis position and a second lateral end of the tool mount is at a maximum Z-axis position. Furthermore, in such states of adjustment, the first spring 126*a* and the second spring 126*b* are compressible either separately and independently or in combination but to different degrees to vary the side-to-side or widthwise tilt of the tool mount 120 without adjustment of the first actuator and without adjustment of the second actuator.

In the illustrated embodiment, the flexible rigging 421 is coupled with the tool mount 120 at a single connection point and can slide or otherwise move along its length relative to the single connection point in response to adjustment of the first rocker 424*a* and the second rocker 424*b*. For example, if the first rocker 424*a* is raised and the second rocker 424*b* is lowered, the flexible rigging 421 can slide relative to its coupling location with the tool mount 120 to increase the length of the portion of flexible rigging 421 coupled with the first rocker 424*a*, decrease the length of the portion of flexible rigging 421 coupled with the second rocker 424*b*, and depending on the net effect of the adjustments, maintain, increase, or decrease the Z-axis positioning of the tool mount 120. The flexible rigging 421 can thereby provide a net effective length or Z-axis positioning of the tool mount 120 which is an average or weighted and/or offset average of the length or Z-axis positioning that would otherwise be provided by the respective adjustment positions of the first rocker 424*a* and the second rocker 424*b*.

In other embodiment, the flexible rigging 421 may be coupled with the tool mount 120 at two connection points spaced apart laterally along the width of the tool mount 120 in the X-axis direction such that the flexible rigging 421 can slide or otherwise move along its length relative to the two connection points in response to adjustment of the first rocker 424*a* and the second rocker 424*b*. For example, if the first rocker 424*a* is raised and the second rocker 424*b* is lowered, the flexible rigging 421 can slide relative to its coupling locations with the tool mount to increase the length of the portion of flexible rigging 421 coupled with the first rocker 424*a*, decrease the length of the portion of flexible rigging 421 coupled with the second rocker 424*b*, and depending on the net effect of the adjustments, maintain, increase, or decrease the Z-axis positioning of the tool mount 120. The flexible rigging 421 can thereby provide a net effective length or Z-axis positioning of the tool mount 120 which is an average or weighted and/or offset average of the length or Z-axis positioning that would otherwise be provided by the respective adjustment positions of the first rocker 424*a* and the second rocker 424*b*.

In other embodiments, the flexible rigging 421 may be coupled with the tool mount 120 at a single connection point such that the flexible rigging 421 is fixed and does not slide or move along its effective length in response to adjustment of the first rocker 424*a* and the second rocker 424*b*. The flexible rigging 421 can thereby provide a net effective length or Z-axis positioning of the tool mount 120 which is the lesser of the length or Z-axis positioning provided by the respective adjustment positions of the first rocker 424*a* and the second rocker 424*b*.

In other embodiment, the flexible rigging 421 may be coupled with the tool mount 120 at two connection points spaced apart along the width of the tool mount 120 in the X-axis direction such that the flexible rigging 421 is fixed and does not slide or move along its effective length in response to adjustment of the first rocker 424*a* and the second rocker 424*b*. The flexible rigging member can thereby provide a net effective length or Z-axis positioning of the tool mount 120 which is the lesser of the length or Z-axis positioning provided by the respective adjustment positions of the first rocker 424*a* and the second rocker 424*b*.

In other embodiment, the flexible rigging 421 may comprise two separate portions respectively coupled with the tool mount 120 at a common connection point or at two connection points spaced apart along the width of the tool mount 120 in the X-axis direction such that two separate portions of flexible rigging 421 are fixed and do not slide in response to adjustment of the first rocker 424*a* and the second rocker 424*b* to provide a net effective length or Z-axis positioning of the tool mount 120 which is the lesser of the length or Z-axis positioning provided by the respective adjustment positions of the first rocker 424*a* and the second rocker 424*b*.

Actuator 142 is selectably controllable to expand and contract generally in the Y-axis direction effective to cause tool mount 120 to rotate relative to the work machine about an axis generally parallel with the X-axis direction. In this manner, the pitch of the tool mount X-Y plane may be varied. This rotation can be utilized to rotate the grading tool assembly 120 (raising one of the forward edge and the rearward edge and lowering the other) relative to the underlying ground surface and to control the force it applies to the underlying ground surface in the Z-axis direction. Tool mount 120 is coupled with the first suspension element 125*a* by a first pivotable coupling and is coupled with the second suspension element 125*b* by a second pivotable coupling. The first suspension element 125*a* and the second suspension element 125*b* are respectively connected to the first rocker 424*a* and the second rocker 424*b* at respective pivotable couplings. Tool mount 120 is further coupled with a pulling linkage 130 at a pivotable coupling which rotates generally about an axis in parallel with the X-axis direction. Pulling linkage 130 is coupled with the chassis of the work machine at a pivotable coupling which rotates about an axis in parallel with the X-axis direction. Pulling linkage is configured to provide a force vector component to the tool assembly in the forward or reverse Y-axis direction as the machine is propelled forward or backward. A force vector component generally in the Y-axis direction may also be provided, for example, during turning of the machine. Regardless of the particular direction, the pulling linkage provides one or more force vector components providing working force to the tool assembly. Furthermore, the rotation permitted by pivotable couplings between pulling linkage and the chassis of the work machine accommodates both adjustment of the height or Z-axis potion, front-to-back or lengthwise angle or pitch of the tool assembly relative to the X-Y plane, and side-to-side or widthwise angle or pitch of the tool assembly relative to the X-Y plane.

The automatic grading system of work machine 101' includes a pole assembly 550 with which the receiver 492 is coupled. In other embodiments, the receiver 492 may be coupled with other components or provided at other locations of the work machine 101'. The pole assembly 550 includes an upper pole member 564, a middle pole member 563, and a lower pole member 554. Upper pole member 564 receives and is adjustably coupled with middle pole member 563 by set screws or other fasteners permitting operator adjustment of the Z-axis position of upper pole member 564 relative to middle pole member 563. Lower pole member 554 receives and is selectably coupled with middle pole member 563 by set screws or other fasteners permitting removal when desired. In some embodiments, the lower pole member 554 may be slidably coupled with a base member fixedly coupled with the chassis of work machine 101'. In some embodiments, the lower pole member 554 may be fixedly coupled with a base member fixedly coupled with the chassis of work machine 101'.

In some forms, the receiver 492 may comprise one or more global navigation satellite system (GNSS) receivers, for example, one or more global positioning system (GPS) receivers or other types of GNNS receivers, which may be configured and operable to receive a positional information signal from a satellite-based transmission source, a terrestrial-based repeater or relay source, or another positional signal generation source. The GNNS receiver may be of a number of types including, for example, as a dual-frequency GNNS receiver or another type of GNNS receiver. In some forms, the receiver 492 may additionally or alternatively comprise a local positioning system (LPS) receiver, for example, a total station (TS) or total station theodolite (TST) receiver or other types of LPS receivers, which may be configured and operable to receive a positional information signal from a transmission source provided at a worksite or other location of interest. The receiver 492 may detect, demodulate, decode, or otherwise process received positional information signals and provide the detected, demodulated, decoded, or otherwise processed positional information signals or positional information thereof to electronic controller 495. The electronic controller 495 may adjust one or both of the first actuator 440a and the second actuator 440b in response to the positional information signals.

In some forms, the electronic controller 495 may be configured with a grading map, for example, a multi-dimensional array, matrix, other data structure comprising a plurality of map position and a corresponding or correlated plurality of adjustment commands or settings for the first actuator 440a and for the second actuator 440b. The grading map may be stored in one or more non-transitory memory devices of the electronic controller 495 (e.g., provided in or operatively coupled with the electronic controller 495). The electronic controller 495 is configured and operable to process the positional information from the receiver 492 to identify a matching (or best or most closely matching) one of the plurality of map positions, determine or identify a corresponding adjustment command or setting of the first actuator 440a and a corresponding adjustment command or setting of the second actuator 440b, and, in response thereto, generate and output control signals to control the first actuator 440a to a position or adjustment state according to its respective determined or identified adjustment command or setting, and to control the second actuator 440b to a position or adjustments according to its respective determined or identified adjustment command or setting. The plurality of adjustment commands or settings and/or the positions or adjustment states of the first actuator 440a and the second actuator 440b may be selected to bias the tool mount 120 to predetermined Z-axis positions and predetermined side-to-side, or widthwise tilting at each of a plurality of locations of the grading map.

In one example, the grading map comprises a plurality of map positions corresponding to locations in the area of a given worksite and preferably substantially covering an area of the worksite which is to be automatically graded. Each of the plurality of map positions corresponds to or is correlated with, directly or indirectly via one or more intermediate links, calculations, or other operations, an adjustment command or setting for the first actuator 440a and an adjustment command or setting for the second actuator 440b. For example, the adjustment commands or settings for the first actuator 440a and the second actuator 440b may correspond to grading parameters including a Z-axis grade depth, X-axis pitches or angles relative to the X-Y plane, and Y-axis pitches or angles relative to the X-Y plane for each of the map positions. The controller 495 is further configured to automatically adjust the first actuator 440a and the second actuator 440b to bias the first suspension element 125a, the second suspension element 125b, and the tool mount 120 and any tools coupled thereto toward the corresponding grading parameters for each of the map positions. The controller 459 may also be configured to transition between map positions by averaging or interpolating between grading parameters for adjacent or contiguous map positions.

The work machine 101' can be operated to travel over and automatically grade the area of the worksite covered by the grading map. During such operation, the tool mount 120 and any tools coupled thereto are biased toward a position providing the grading parameters defined by the grading map. The first suspension element 125a and the second suspension element 125b may compress in response to force generated by contact with the underlying ground surface causing the tool mount 120 and any tools attached thereto to move be displaced from their biased positions. The work machine 101' may make repeated passes as needed to eliminate such displacement achieve the grading parameters defined by the grading map.

The receiver 492 may be provided in a number of forms, including those described above, and may also be provided in a number of positions relative to various structures of the work machine. For example, various forms of the receiver may comprise a GNNS receiver, an LPS, receiver a laser receiver, or a combination of two or more such receivers.

In some embodiments, the pole assembly 550 and the receiver 492 are maintained at a substantially fixed position relative to the chassis of the work machine 101' and the receiver 492 may comprise a GNNS receiver or an LPS receiver. In other embodiments, the pole assembly 550 and the receiver 492 may be moveable or adjustable to a plurality of Z-axis positions relative to the chassis of the work machine 101' in response to operation of the first actuator 440a or the second actuator 440b and the receiver 492 may comprise a combination of a GNNS receiver or an LPS receiver and a laser receiver such laser receiver 192. In such forms, the pole assembly 550 be operatively coupled with one of the first rocker 424a and the second rocker 424b using a mechanism substantially similar to that illustrated and described in connection with the work machine 101, including the features illustrated and described in connection with FIGS. 15A-15E and FIGS. 16A-16E but coupled with and moveable with only one of the first rocker 424a or its associated structures and the second rocker 424b or its associated structures.

Some embodiments may comprise one or more GNNS receivers or LPS receivers and one or more separate laser receiver. In some such embodiments, the receiver 492 may be a GNNS receiver or an LPS receiver provided on the assembly 550 which is maintained at a substantially fixed position relative to the chassis of the work machine 101' and a second receiver 192' may be provided on a separate pole coupled with one of the first suspension element 125a and the second suspension element 125b and which may be the same as or substantially similar to the receiver 192 and the pole 194 illustrated and described in connection with the work machine 101. In some such embodiments, the receiver 492 may be a laser receiver provided on the pole assembly 550 which may be moveable to a plurality of Z-axis positions relative to the chassis of the work machine 101' and a second, separate GNNS receiver or an LPS receiver may be separately provided, for example, on a separate location fixedly coupled with the chassis of the work machine 101 such as on a separate fixed position pole.

The work machine 101' may include one or more of the sighting gauge features described in connection with work machine 101 and work machine 100, including the sighting gauge system 202, the sighting gauge 390, or both the sighting gauge system 202 and the sighting gauge 390.

Figure 23:
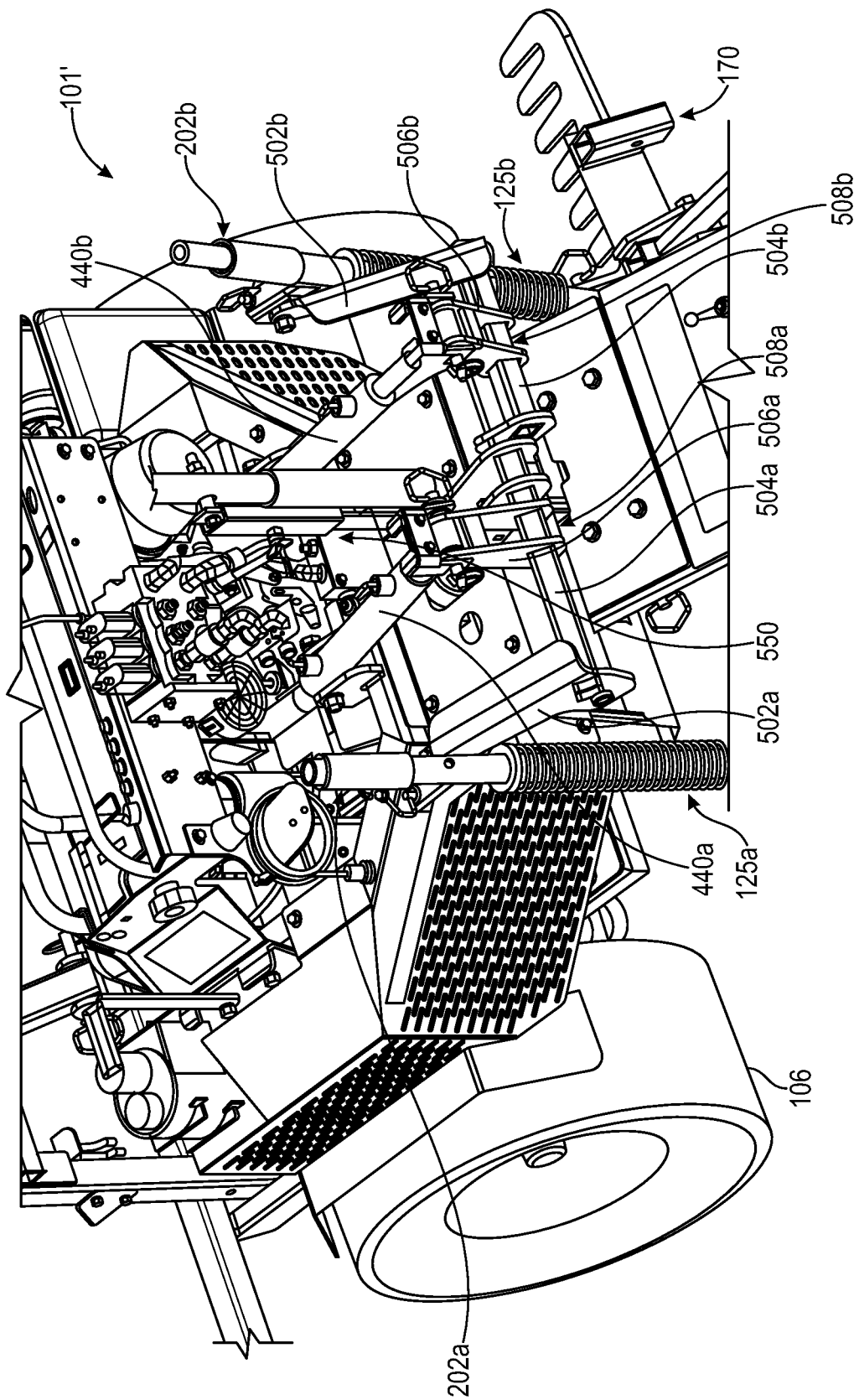
FIG. 23 is a perspective view of a portion of another form of the example work machine of FIG. 17.
Figure 24:
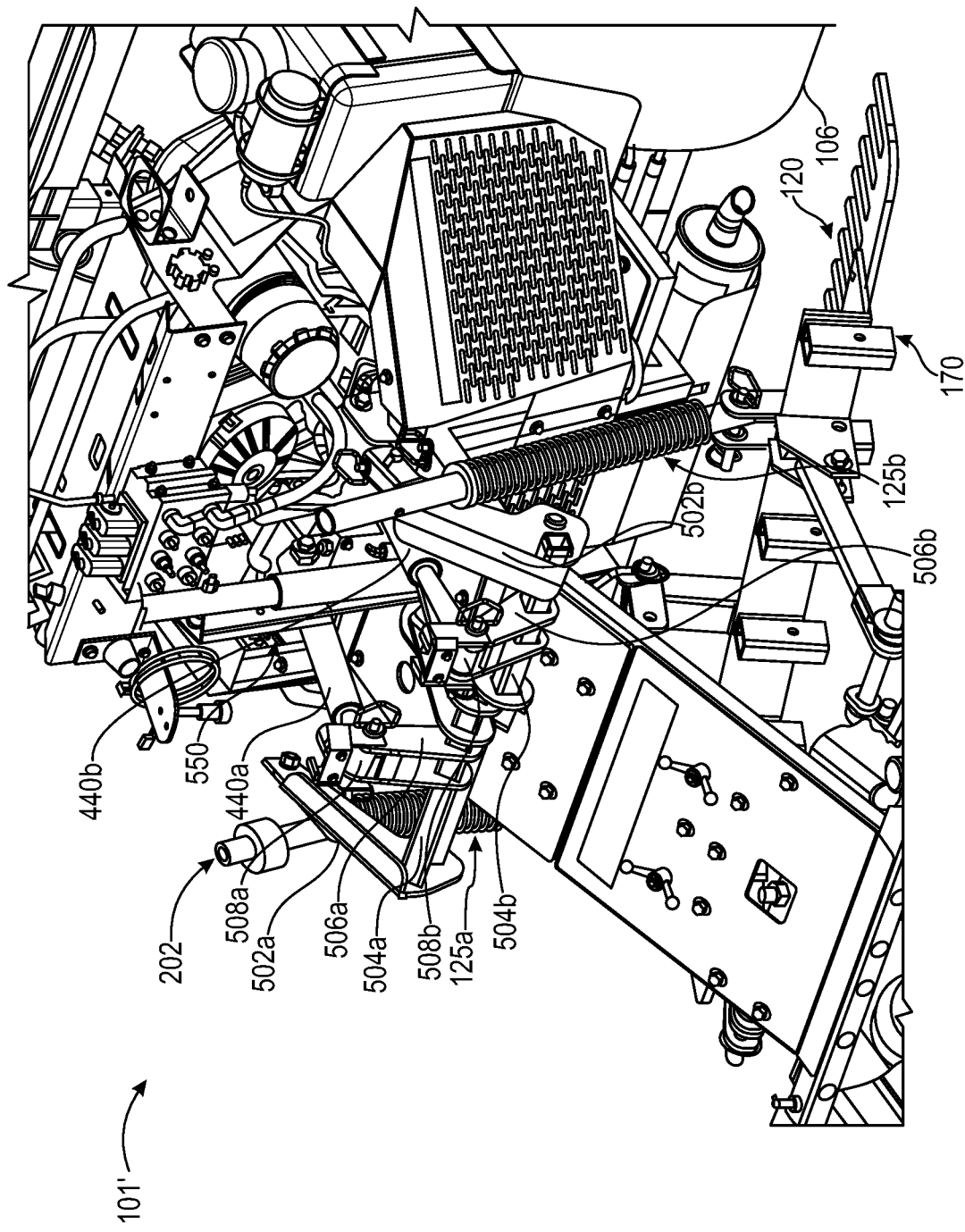
FIG. 24 is a perspective view of a portion of the example work machine of FIG. 17 in the second state of adjustment.

Furthermore, as illustrated in FIG. 23, multiple sighting gauges 202a, 202b may be provided in combination with the first suspension element 125a and the second suspension element 125b, respectively to provide independent visual indicia of the position of each side of the tool mount 120 and one or more tools as may be coupled therewith.

Some forms of the automatic grading system of the work machine 101' may comprise one or more additional receivers configured and operable to provide information indicative of a lateral tilt (also referred to as side-to-side or widthwise tilt) of one or more components of the automatic grading system and/or the work machine 101'. Several examples of such forms are illustrated and described in connection with FIGS. 25A, 25B, and 25C, and FIGS. 26A, 26B, and 26C.

Figure 25A:
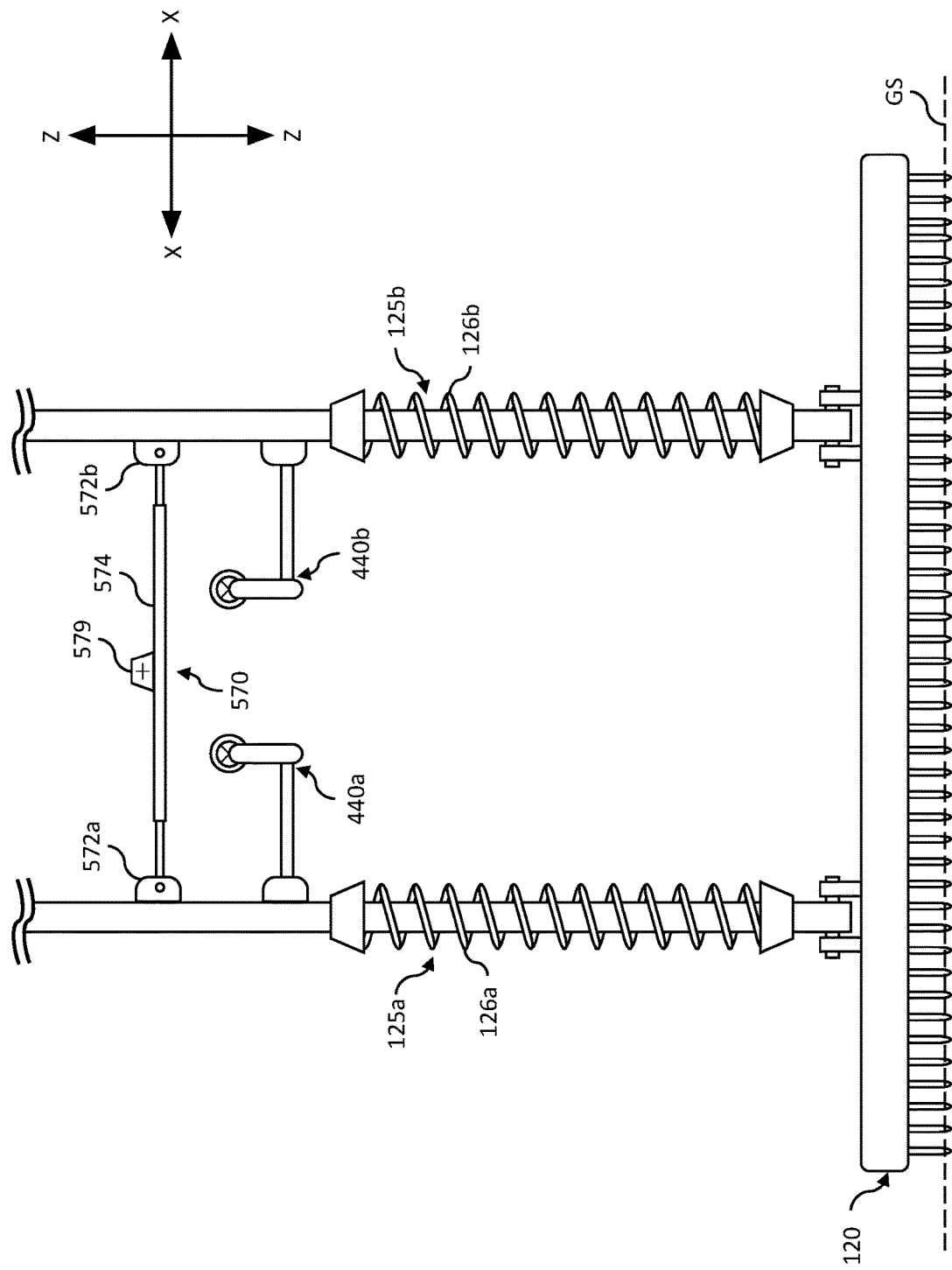
Figure 25B:
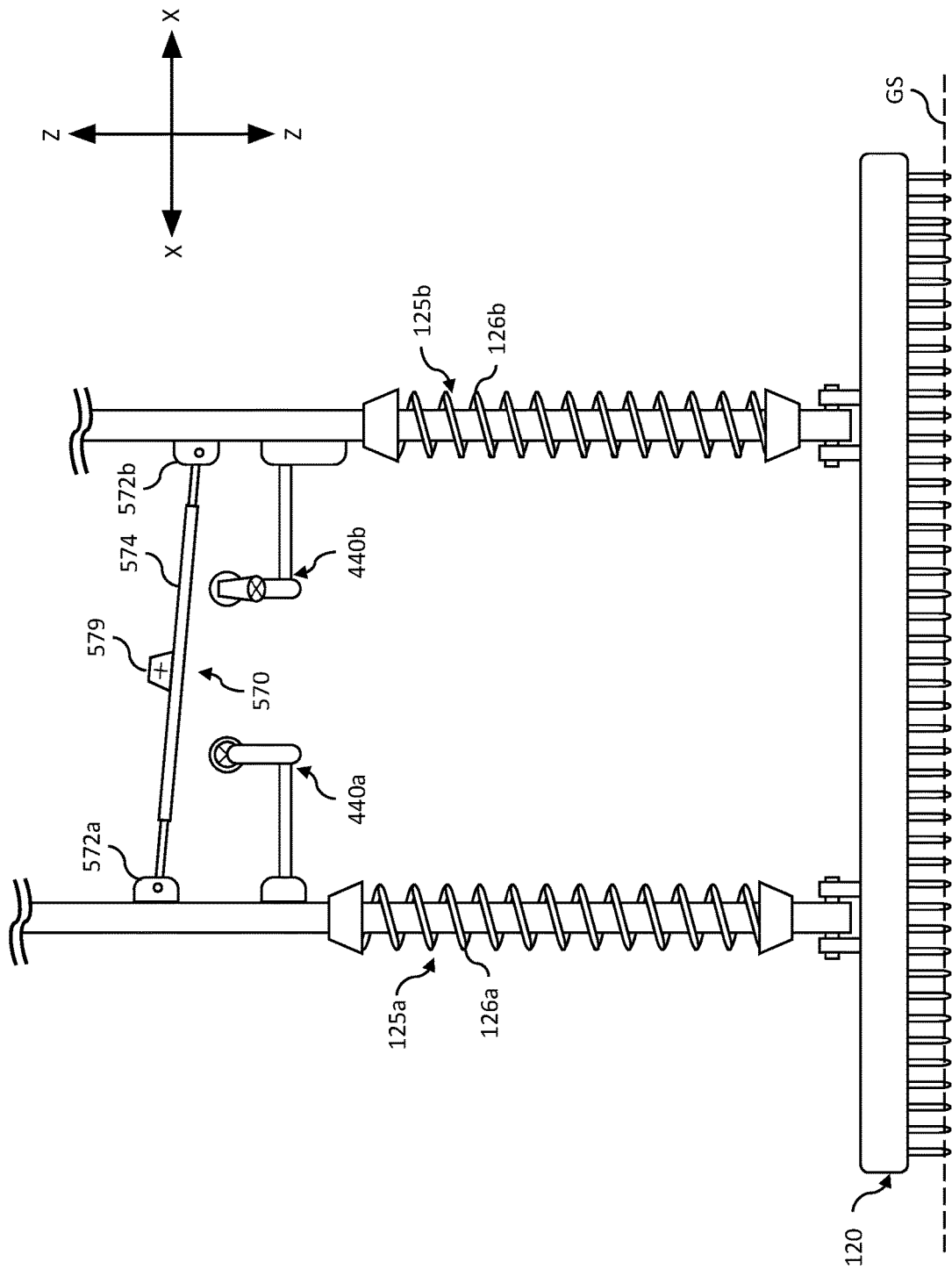

With reference to FIGS. 25A, 25B, and 25C, there are illustrated certain portions of the automatic grading system of work machine 101' which are depicted in isolation from other portions for clarity of illustration. It shall be appreciated that the illustrated aspects of FIGS. 25A, 25B, and 25C may be provided in connection with any of the embodiment, forms, modifications, and variants of the work machine 101' and the automatic grading system thereof disclosed herein.

The automatic grading system of work machine 101' may comprise a tilt sensor system 570 including one or more provided on a linkage 574 which is operatively coupled with the first suspension element 125a at a first pivotable coupling 572a and is operatively coupled with the second suspension element 126b at a second pivotable coupling 572b. In the embodiment or form of FIGS. 25A, 25B, and 25C, the tilt sensor system 570 is coupled with the first suspension element 125a and the second suspension element 125b at respective locations positioned above or on a first side of the springs 126a and 126b, respectively. Additionally or alternatively, one more sensors may be coupled with the first suspension element 125a and the second suspension element 125b at other locations above or on the first side of the springs 126a and 126b. The one or more tilt sensors 579 are in operative communication with the electronic controller 495 and the one or more tilt sensors 579 and the electronic controller 495 are in combination configured to determine a lateral tilt (also referred to as side-to-side or widthwise tilt) of the tool mount 120 and one or more tools as may be coupled therewith.

As illustrated in FIG. 25A, the first actuator 404a and the second actuator 440b may be adjusted to substantially the same position such that springs 126a and 126b have substantially the same degree of compression. In such states, the one or more tilt sensors 579 are positioned by linkage 572 to have substantially zero lateral tilt and will sense and provide to the electronic controller 495 a signal indicative of this tilt. In this state of adjustment, the signal indicative substantially zero lateral tilt also corresponds to the lateral tilt of the tool mount 120 and one or more tools as may be coupled therewith.

As illustrated in FIG. 25B, the first actuator 404a and the second actuator 440b may be adjusted to different positions such that springs 126a and 126b have different degrees of compression, for example, due to greater compression of one of the springs 126a and 126b via contact with an underling ground surface GS. In such states, the one or more tilt sensors 579 are positioned by linkage 574 to have a non-zero lateral tilt and will sense and provide to the electronic controller 495 a signal indicative of this tilt. In this state of adjustment, the signal indicative lateral tilt does not correspond to the actual lateral tilt of the tool mount 120 and one or more tools as may be coupled therewith, but does correspond to the angle or degree of tilt to which the tool mount 120 and one or more tools as may be coupled therewith are biased and may ultimately achieve once the underlying ground surface GS is worked to accommodate such positioning.

Decoupling of the angle or degree of lateral tilt sensed by the one or more tilt sensors 579 and the actual to the angle or degree of tilt of the tool mount 120 and one or more tools as may be coupled therewith permits the automatic grading system to follow the adjustment commands determined by the electronic controller 495 in response to received positional information even when the corresponding grade cannot be immediately achieved. This capability amplifies the effectiveness of the work machine 101' allowing grading to be achieved that would otherwise require heavier equipment or greater force. Thus, from the state of adjustment of FIG. 25B, grading operation of the work machine 101' may continue until the signal indicative lateral tilt corresponds to the actual lateral tilt of the tool mount 120 and one or more tools as may be coupled therewith and the desired grading of the underlying ground surface GS has been achieved. Such a state of adjustment is illustrated, for example, in FIG. 25C.

Figure 26A:
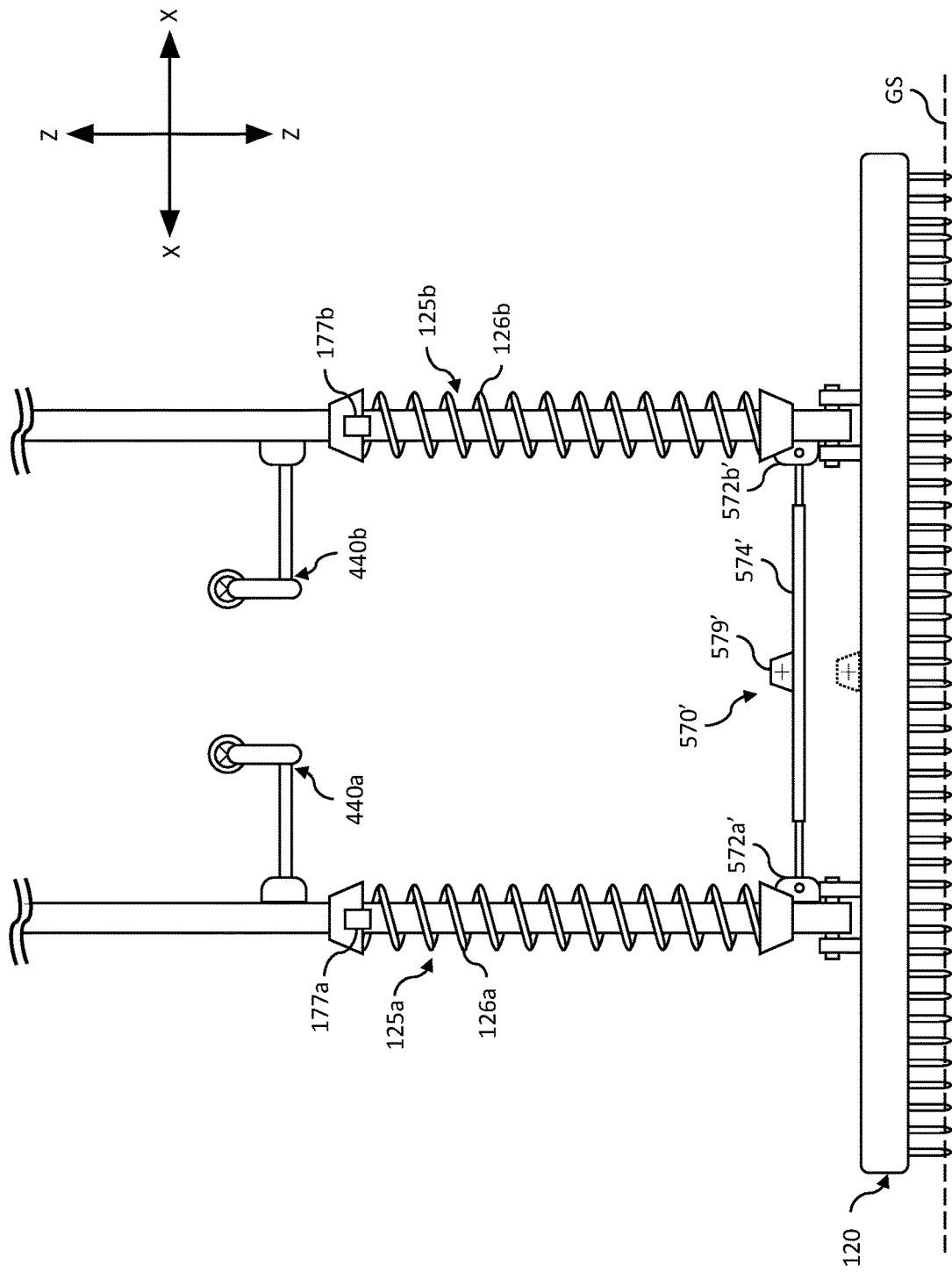
FIGS. 26A, 26B, and 26C are partially schematic front views of another form of a portion of the example work machine of FIG. 17 in several states of adjustment.
Figure 26B:
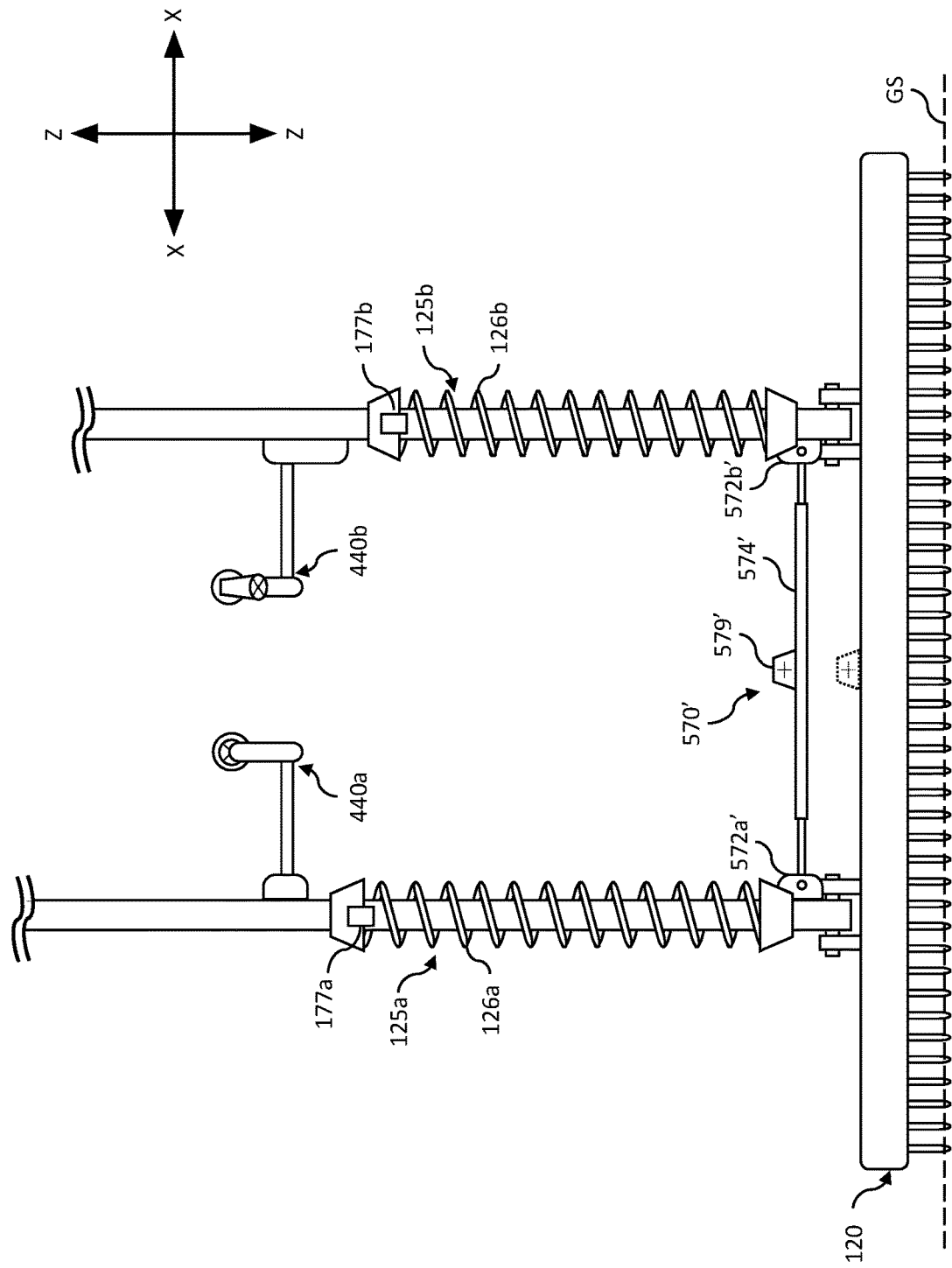
Figure 26C:
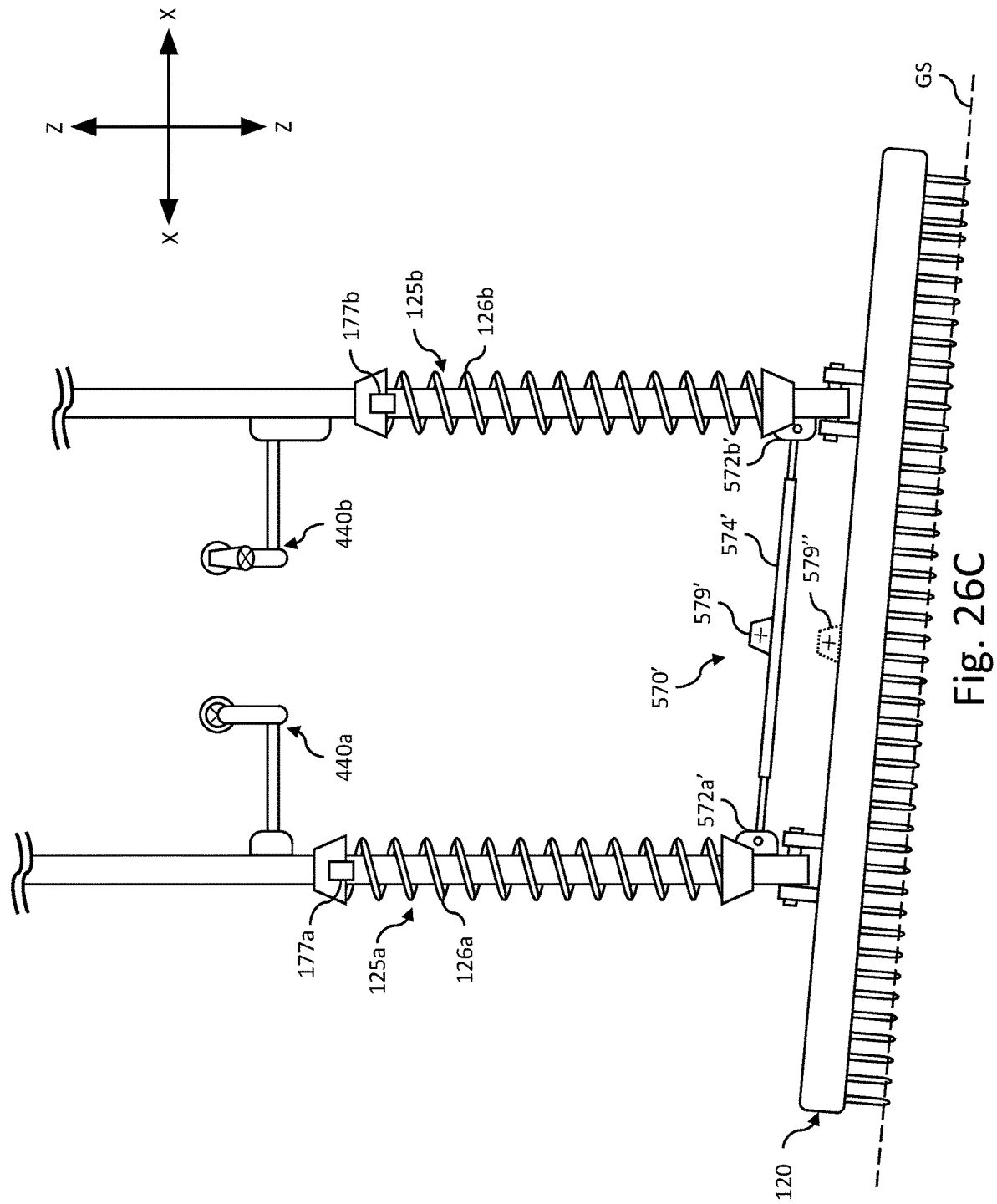

With reference to FIGS. 26A, 26B, and 26C, there are illustrated certain portions of the automatic grading system of work machine 101' which are depicted in isolation from other portions for clarity of illustration. It shall be appreciated that the illustrated aspects of FIGS. 25A, 25B, and 25C may be provided in connection with any of the embodiment, forms, modifications, and variants of the work machine 101' and the grading system thereof disclosed herein.

The automatic grading system of work machine 101' may comprise a tilt sensor system 570' including one or more tilt sensors 579' provided on a linkage 574' which is operatively coupled with the first suspension element 125a at a first pivotable coupling 572a', and is operatively coupled with the second suspension element 126b b at a second pivotable coupling 572b'. In the embodiment or form of FIGS. 26A, 26B, and 26C, the tilt sensor system 570' is coupled with the first suspension element 125a and the second suspension element 125b at respective locations positioned below or on a second side of the springs 126a and 126b, respectively. Additionally or alternatively, one more sensors may be provided at other locations below or on the second side of the springs 126a and 126b, for example, on the tool mount 120 as one or more tilt sensors 579". The one or more tilt sensors 579' are in operative communication with the electronic controller 495 and the one or more tilt sensors 579' and the electronic controller 495 are in combination configured to determine a lateral tilt (also referred to as side-to-side or widthwise tilt) of the tool mount 120 and one or more tools as may be coupled therewith.

As illustrated in FIG. 26A, the first actuator 404a and the second actuator 440b may be adjusted to substantially the same position such that springs 126a and 126b have substantially the same degree of compression. In such states, the one or more tilt sensors 579' are positioned by linkage 574' to have substantially zero lateral tilt and will sense and provide to the electronic controller 495 a signal indicative of this tilt. In this state of adjustment, the signal indicative substantially zero lateral tilt also corresponds to the lateral tilt of the tool mount 120 and one or more tools as may be coupled therewith.

As illustrated in FIG. 26B, the first actuator 404a and the second actuator 440b may be adjusted to different positions such that springs 126a and 126b have different degrees of compression, for example, due to greater compression of one of the springs 126a and 126b via contact with an underling ground surface GS. In such states, the one or more tilt sensors 579' are positioned by linkage 572 to have substantially zero lateral tilt and would sense and provide to the electronic controller 495 a signal indicative of this tilt if the compression one or both of the springs 126a and 126b is not accounted for.

Additional sensors may be provided to account for or correct for differences in relative compression or deflection or compression of one or both of the springs 126a and 126b. A sensor 177a may be operatively coupled with the first suspension element 125a and configured and operable to sense the degree or magnitude of compression or deflection of the spring 126a. A sensor 177b may be operatively coupled with the second suspension element 125b and configured and operable to sense the degree or magnitude of compression or deflection of the spring 126b. The sensor 177a and the sensor 177b may be in operative communication with the electronic controller 495 and in combination therewith may be utilized to adjust a signal otherwise indication substantially zero tilt to an adjusted signal indicating the angle or degree of tilt to which the tool mount 120 and one or more tools as may be coupled therewith are biased and may ultimately achieve once the underlying ground surface GS is worked to accommodate such positioning.

Decoupling of the adjusted angle or degree of lateral tilt (which is determined from the information sensed by the one or more tilt sensors 579 and the sensor 177a and the sensor 177b) and the actual to the angle or degree of tilt of the tool mount 120 and one or more tools as may be coupled therewith permits the automatic grading system to follow the adjustment commands determined by the electronic controller 495 in response to received positional information even when the corresponding grade cannot be immediately achieved. This capability amplifies the effectiveness of the work machine 101' allowing grading to be achieved that would otherwise require heavier equipment or greater force. Thus, from the state of adjustment of FIG. 26B, grading operation of the work machine 101' may continue until the signal indicative lateral tilt corresponds to the actual lateral tilt of the tool mount 120 and one or more tools as may be coupled therewith and the desired grading of the underlying ground surface GS has been achieved. Such a state of adjustment is illustrated, for example, in FIG. 26C.

While example embodiments have been illustrated and described in detail in the drawings and foregoing description, the same is to be considered as illustrative and not restrictive in character, it being understood that only certain example embodiments have been shown and described and that all changes and modifications that come within the spirit of the inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Language indicating spatial or geometric relationships, directions or characteristic shall be understood to include and encompass relationships that are within a margin of variation which a person of skill in the art would deem acceptable for a given application.

The invention claimed is:

1. A work machine comprising:
   a chassis extending along a width in an X-axis direction, a length in a Y-axis direction, and a height in a Z-axis direction;
   a plurality of ground contacting members rotatably coupled with the chassis;
   a first actuator operatively coupled with a first suspension element and the chassis;
   a second actuator operatively coupled with a second suspension element and the chassis;
   a grading tool assembly coupled with the first suspension element and the second suspension element and extending in the X-axis direction between a first side and a second side;
   a receiver operatively coupled with the chassis and configured and operable to detect a wireless signal; and
   an electronic controller in operative communication with the receiver, the first actuator, and the second actuator, the electronic controller being configured and operable to control the first actuator and the second actuator in response to a wireless signal detected by the receiver to adjust the first suspension element, the second suspension element, and the grading tool assembly to a first state of adjustment wherein the first suspension element biases the first side of the grading tool assembly to a first Z-axis position and the second suspension element biases the second side of the grading tool assembly to the first Z-axis position, and to a second state of adjustment wherein the first suspension element biases the first side of the grading tool assembly to the first Z-axis position and the second suspension element biases the second side of the grading tool assembly to a second Z-axis position offset from the first Z-axis position in the Z-axis direction.

2. The work machine of claim 1, wherein in the first state of adjustment the first suspension element is compressible without adjustment of the first actuator and without adjustment of the second actuator to displace the first side of the grading tool assembly from the first Z-axis position and vary side-to-side tilt of the of the grading tool assembly.

3. The work machine of claim 2, wherein in the first state of adjustment the second suspension element is compressible independently from the first suspension element and without adjustment of the first actuator and without adjustment of the second actuator to displace the second side of the grading tool assembly from the first Z-axis position and vary side-to-side tilt of the of the grading tool assembly.

4. The work machine of claim 2, wherein in the first state of adjustment the second suspension element is compressible in combination with the first suspension element and without adjustment of the first actuator and without adjustment of the second actuator to displace the first side and the second side of the grading tool assembly from the first Z-axis position without varying the side-to-side tilt of the of the grading tool assembly.

5. The work machine of claim 1, wherein in the second state of adjustment the first suspension element is compressible without adjustment of the first actuator and without adjustment of the second actuator to displace the first side of the grading tool assembly from the first Z-axis position and vary side-to-side tilt of the of the grading tool assembly.

6. The work machine of claim 5, wherein in the second state of adjustment the second suspension element is compressible independently from the first suspension element and without adjustment of the first actuator and without adjustment of the second actuator to displace the second side of the grading tool assembly from the second Z-axis position and vary side-to-side tilt of the of the grading tool assembly.

7. The work machine of claim 5, wherein in the second state of adjustment the second suspension element is compressible in combination with the first suspension element and without adjustment of the first actuator and without adjustment of the second actuator to displace the first side of the grading tool assembly from the first Z-axis position and to displace the second side of the grading tool assembly from the second Z-axis position without varying the side-to-side tilt of the of the grading tool assembly.

8. The work machine of claim 1, wherein the receiver comprises at least one of a global navigation satellite system (GNSS) receiver and a local positioning system (LPS) sensor.

9. The work machine of claim 8, wherein the receiver is coupled with and is maintained in a substantially fixed position relative to the chassis.

10. The work machine of claim 1, wherein the receiver is coupled with the chassis and moveable relative to the chassis in response to movement of one of the first actuator and the second actuator.

11. The work machine of claim 1, wherein the electronic controller to is configured to process positional information received by the receiver, identify a position on a grading map stored in a nontransitory memory medium in response to the positional information, and control the first actuator in response to a first setting associated with the position on the grading map and control the second actuator in response to a second setting associated with the position on the grading map.

12. The work machine of claim 1, comprising a tilt sensor coupled with a linkage coupled with and extending between the first suspension element and the second suspension element.

13. The work machine of claim 12, wherein
the linkage and the first actuator are coupled with the first suspension element on a first side of a first compressible member,
the linkage and the second actuator are coupled with the second suspension element on a first side of a second compressible member, and
the grading tool assembly is coupled with the first suspension element on a second side of the first compressible member and is coupled with the second suspension element on a second side of the second compressible member.

14. The work machine of claim 12, wherein a tilt of the linkage moves in response to the first actuator and the second actuator regardless of whether the first suspension element is compressed and regardless of whether the second suspension element is compressed.

15. An apparatus comprising:
a work machine extending along a width in an X-axis direction, a length in a Y-axis direction, and a height in a Z-axis direction and comprising
a plurality of rotatable ground contacting members supporting the work machine on an underlying ground surface;
a first actuator operatively coupled with a first suspension element, the first suspension element being compressible in at least the Z-axis direction;
a second actuator operatively coupled with a second suspension element the first suspension element being compressible in at least the Z-axis direction;
a tool mount coupled with the first suspension element and the second suspension element and extending in the X-axis direction between a first side and a second side;
a wireless receiver configured and operable to receive a wireless signal; and
an electronic controller in operative communication with the receiver, the first actuator, and the second actuator, the electronic controller being configured and operable to control the first actuator and the second actuator in response to positional information of the wireless signal received by the receiver to position the first suspension element, the second suspension element, and the tool mount in a plurality of positions including a first position with a first side-to-side tilt of the of the tool mount and a second position with a second side-to-side tilt of the of the tool mount, the first suspension element and the second suspension element being compressible independently from one another in the first position and the second position.

16. The apparatus of claim 15 wherein, in the first state of adjustment the first suspension element biases the first side of the tool mount to a first Z-axis position and the second suspension element biases the second side of the tool mount to the first Z-axis position.

17. The apparatus of claim 16 wherein, in the second state of adjustment the first suspension element biases the first side of the tool mount to the first Z-axis position and the second suspension element biases the second side of the tool mount to a second Z-axis position offset from the first Z-axis position in the Z-axis direction.

18. The apparatus of claim 15 wherein, the first suspension element and the second suspension element are compressible concurrently with one another in the first position and the second position.

19. The apparatus of claim 15, comprising a ground engaging tool coupled with the tool mount.

20. The apparatus of claim 15, comprising a tilt sensor operatively coupled with the electronic controller and configured to communicate information indicative of a lateral tilt associated with the first suspension element and the second suspension element to the electronic controller.

* * * * *